(12) United States Patent
Tojo et al.

(10) Patent No.: US 7,005,176 B2
(45) Date of Patent: Feb. 28, 2006

(54) OPTICAL ADHESIVE POLYESTER FILM

(75) Inventors: Mitsuo Tojo, Gifu (JP); Koji Kubo, Gifu (JP); Shinji Yano, Gifu (JP); Tetsuo Ichihashi, Gifu (JP)

(73) Assignee: Teijin Dupont Films Japan Limited, Tokyo (JP)

( * ) Notice: Subject to any disclaimer, the term of this patent is extended or adjusted under 35 U.S.C. 154(b) by 0 days.

(21) Appl. No.: 10/467,623

(22) PCT Filed: Dec. 5, 2002

(86) PCT No.: PCT/JP02/12769

§ 371 (c)(1),
(2), (4) Date: Aug. 8, 2003

(87) PCT Pub. No.: WO03/049943

PCT Pub. Date: Jun. 19, 2003

(65) Prior Publication Data

US 2004/0076844 A1    Apr. 22, 2004

(30) Foreign Application Priority Data

| Dec. 10, 2001 | (JP) | 2001-375392 |
| Jun. 20, 2002 | (JP) | 2002-179773 |
| Jul. 15, 2002 | (JP) | 2002-205376 |
| Jul. 15, 2002 | (JP) | 2002-205377 |
| Jul. 24, 2002 | (JP) | 2002-214948 |
| Jul. 29, 2002 | (JP) | 2002-219376 |

(51) Int. Cl.
B32B 27/08    (2006.01)
B32B 27/18    (2006.01)
B32B 27/20    (2006.01)
B32B 27/36    (2006.01)

(52) U.S. Cl. ............ 428/141; 428/323; 428/480; 428/482; 252/588; 252/589; 359/350; 359/361

(58) Field of Classification Search .......... 428/191, 428/480, 483, 323, 212; 528/302, 307, 308; 524/86, 87, 89, 102, 105; 359/350, 361
See application file for complete search history.

(56) References Cited

U.S. PATENT DOCUMENTS

| 4,291,152 | A |   | 9/1981  | Inata et al. |
| 4,302,506 | A | * | 11/1981 | Heberger ............... 428/341 |
| 4,478,907 | A | * | 10/1984 | Van Gossum et al. ...... 428/327 |
| 4,677,188 | A | * | 6/1987  | Utsumi et al. ............ 528/272 |
| 5,182,169 | A | * | 1/1993  | Fukuda et al. ........... 428/343 |
| 5,480,926 | A | * | 1/1996  | Fagerburg et al. .......... 524/86 |
| 5,581,435 | A | * | 12/1996 | Kinoshita et al. ........ 361/301.5 |
| 5,709,926 | A | * | 1/1998  | Gust .................... 428/206 |
| 5,776,604 | A | * | 7/1998  | Lu et al. ................ 428/343 |
| 5,824,394 | A | * | 10/1998 | Kinoshita et al. ........ 428/195.1 |
| 5,908,688 | A | * | 6/1999  | Okada et al. ............ 428/216 |
| 5,914,188 | A | * | 6/1999  | Kobayashi et al. ........ 428/331 |
| 5,958,552 | A | * | 9/1999  | Fukuda et al. ........... 428/141 |
| 6,287,658 | B1 | * | 9/2001 | Cosentino et al. ........ 428/40.1 |
| 6,355,345 | B1 | * | 3/2002 | Furuya et al. ........... 428/343 |
| 6,368,724 | B1 | * | 4/2002 | Fagerburg ............... 428/480 |
| 6,391,441 | B1 | * | 5/2002 | Yano et al. ............. 428/343 |
| 6,458,467 | B1 | * | 10/2002 | Mizuno et al. .......... 428/480 |
| 6,482,501 | B1 | * | 11/2002 | Mizuno et al. .......... 428/141 |

FOREIGN PATENT DOCUMENTS

| EP | 0 504 522 A2 | * | 9/1992 |
| EP | 0789051 A    |   | 8/1997 |
| JP | 57-057628    |   | 4/1982 |
| JP | 59-012952    |   | 1/1984 |
| JP | 63-48884     |   | 10/1988 |
| JP | 1-125227 A   |   | 5/1989 |
| JP | 01-275031    |   | 11/1989 |
| JP | 02-060941    |   | 3/1990 |
| JP | 02-099527    |   | 4/1990 |
| JP | 8-1886 A     |   | 1/1996 |
| JP | 8-300590 A   |   | 11/1996 |
| JP | 10-156991    |   | 6/1998 |
| JP | 11-216825 A  |   | 8/1999 |
| JP | 2000-246855 A |  | 9/2000 |
| JP | 2000-246856 A |  | 9/2000 |
| JP | 2001-294826 A |  | 10/2001 |
| JP | 2001-302994 A |  | 10/2001 |
| JP | 2001-315262 A |  | 11/2001 |
| JP | 2002-210906 A |  | 7/2002 |
| JP | 2002-212317 A |  | 7/2002 |

* cited by examiner

Primary Examiner—Vivian Chen
(74) Attorney, Agent, or Firm—Sughrue Mion, PLLC

(57) ABSTRACT

An optical adhesive polyester film comprising (A) a polyester film layer containing an aromatic polyester and an ultraviolet absorber and (B) a coating formed on at least one surface of the polyester film (A). The coating (B) contains at least one polymer selected from the group consisting of a coating polyester having a glass transition point of 40 to 100° C. and an acryl polymer having a glass transition point of 20 to 80° C. in an amount of 50 to 95% by weight based on the coating. The optical adhesive polyester film is disposed on the front of a plasma display so as to block externally incoming ultraviolet light.

16 Claims, No Drawings

OPTICAL ADHESIVE POLYESTER FILM

FIELD OF THE INVENTION

The present invention relates to an optical adhesive polyester film. More specifically, it relates to an optical adhesive polyester film having an adhesive coating film formed on at least one surface thereof and having excellent adhesive properties, transparency and weather resistance.

PRIOR ART

Having excellent mechanical properties, heat resistance and chemical resistance, a polyester film, particularly a biaxially stretched film of a polyethylene terephthalate or polyethylene naphthalene dicarboxylate is widely used as a raw material of a magnetic tape, a ferromagnetic thin film tape, a photographic film, a packaging film, a film for electronic parts, an electrical insulating film, a film for laminating a metal plate, a film for sticking to the surface of, for example, a glass display, a film for protecting various members, and other films. In recent years, various optical films in particular are used in many applications, and there are applications such as base films for members of a liquid display such as a prism lens sheet, a touch panel and a backlight, a base film for an antireflective film, and an explosion-proof base film for a display. Base films used in such optical films must have excellent transparency and excellent adhesion to a prism lens, a hard coat, an adhesive, an antireflection treatment and the like.

Further, for outside applications such as a notebook PC and a PDA, any of the films have poor weather resistance, so that the strength and transparency of the films deteriorate, indicating that the films are not capable of enduring long-term use. Meanwhile, in image devices typified by a color television, in response to market demands for higher resolution of a projected image and a larger screen, a light-emitting panel type television using a plasma display or the like, a non-light-emitting panel type television using a liquid crystal display or the like, a rear projection type television incorporating an image projector, and other types of televisions are on their way to the market, in addition to a conventional direct view type television using a CRT. Particularly, the light-emitting panel type plasma display emits light which does not belong to the wavelength ranges of three primary colors (i.e., red, green, and blue) of a color image over the visible range and the infrared range due to the structure of each picture element constituting a light source or discharge unit. For example, emission of strong near infrared light is measured around a wavelength of around 820 nm, 880 nm and 980 nm. The emission of the near infrared light causes problems such as malfunctions in peripheral devices. This is because the wavelength of the emitted near infrared light matches the operation wavelength of near infrared light used in near infrared communication devices such as remote controllers for a television, a video and an air conditioner, portable communication devices, and personal computers.

JP-A 10-156991 (the term "JP-A" as used herein means an "unexamined published Japanese patent application") proposes an external light antireflective film which has a function of preventing malfunctions in peripheral devices caused by near infrared light as described above and an external light antireflection function and can be suitably used for the front panel of an image display device. In order for the external light antireflective film to prevent malfunctions in peripheral devices caused by near infrared light, a near infrared absorber containing layer must be provided. However, since the near infrared absorber has a characteristic that it is weak to ultraviolet light, another layer containing an ultraviolet absorber must also be provided, thereby causing a problem in terms of production costs.

In consideration of the above problems, development of an optical polyester film capable of absorbing ultraviolet light has been desired.

SUMMARY OF THE INVENTION

An object of the present invention is to provide a polyester film which is excellent in adhesion to layers used in various optical applications, transparency, and weather resistance.

Another object of the present invention is to provide an optical adhesive polyester film which can be suitably used on the image display panel of a display for outdoor use, a plasma display or the like.

Still another object of the present invention is to provide an optical adhesive polyester film having suppressed bleed-out of an ultraviolet absorber and having such various properties as described above.

Other objects and advantages of the present invention will be apparent from the following description.

According to the present invention, the above objects and advantages of the present invention are achieved by an optical adhesive polyester film comprising:

(A) a polyester film layer containing an aromatic polyester and an ultraviolet absorber, and (B) a coating formed on at least one surface of the polyester film, wherein the coating contains at least one polymer selected from the group consisting of a coating polyester having a glass transition point of 40 to 100° C. and an acryl polymer having a glass transition point of 20 to 80° C. in an amount of 50 to 95% by weight based on the coating.

In the optical adhesive polyester film of the present invention, the polyester film layer (A) may comprise a single layer or a plurality of laminated layers. Hereinafter, a description will be given to a case where the polyester layer (A) comprises a single layer.

Aromatic Polyester and Polyester Film Layer (A)

As the aromatic polyester constituting the polyester film (A) in the present invention, an aromatic polyester comprising an aromatic dicarboxylic acid component such as terephthalic acid, isophthalic acid, 2,6-naphthalenedicarboxylic acid or 4,4'-diphenyldicarboxylic acid and a glycol component such as ethylene glycol, 1,4-butanediol, 1,4-cyclohexanedimethanol or 1,6-hexanediol is preferred, and a polyethylene terephthalate or polyethylene-2,6-naphthalene dicarboxylate is particularly preferred. Further, the aromatic polyester may be a copolyester, and as copolymerizable components, the above components can be used, for example.

The aromatic polyester has an intrinsic viscosity (in o-chlorophenol at 35° C.) of preferably 0.45 to 0.80, more preferably 0.50 to 0.75, much more preferably 0.55 to 0.70.

The above aromatic polyester may contain organic or inorganic inert fine particles as a lubricant as required so as to improve the windability of a film at the time of film formation and the transportability of the film at the time of application of a hard-coat layer, an adhesive or the like. Illustrative examples of the fine particles include calcium carbonate, calcium oxide, aluminum oxide, kaoline, silicon oxide, zinc oxide, crosslinked acrylic resin particles, crosslinked polystyrene resin particles, urea resin particles, melamine resin particles, and crosslinked silicone resin particles.

The inert fine particles preferably have an average particle diameter of 0.01 to 2.0 μm, more preferably 0.1 to 1.0 μm. Further, the content of the inert fine particles in the polyester film layer (A) is preferably 0.003 to 0.5 wt %, more preferably 0.005 to 0.1 wt %.

The polyester film layer (A) preferably has a surface roughness Ra of 3 to 30 nm, more preferably 5 to 20 nm. When Ra is smaller than 3 nm, the coefficient of friction of the surface of the film becomes high, so that handling properties and scratch resistance deteriorate. Meanwhile, when Ra is larger than 30 nm, the surface of the film becomes rough, so that reflection on the surface increases, and total light transmittance deteriorates accordingly.

The polyester film layer (A) has a thickness of preferably 50 to 200 μm, more preferably 75 to 175 μm. When the thickness is smaller than 50 μm, the elasticity of the film is relatively low, so that flatness is liable to be degraded and scratches are liable to be produced during processing, while when the thickness is larger than 200 μm, the film becomes so elastic that processability thereof is liable to deteriorate and transparency thereof also deteriorates.

In addition to the inert fine particles, the polyester layer (A) may also contain a colorant, an antistatic agent, an antioxidant, a lubricant, a catalyst, other resins such as a polyethylene, a polypropylene, an ethylene-propylene polymer and an olefinic ionomer in such amounts that do not impair transparency.

Ultraviolet Absorber

The polyester film layer (A) contains an ultraviolet absorber. Preferably, as the ultraviolet absorber, at least one compound selected from the group consisting of a cyclic imino ester represented by the following formula (I):

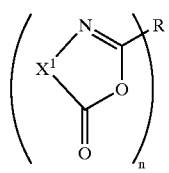

(I)

wherein $X^1$ is a divalent aromatic residue whose two links are at positions 1 and 2; n is 1, 2 or 3; $R^1$ is an n-valent hydrocarbon residue which may further contain a hetero atom, and $R^1$ can be a direct bond when n=2, and a cyclic imino ester represented by the following formula (II):

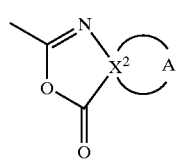

(II)

wherein A is a group represented by the following formula (II)-a:

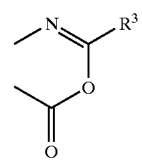

(II)-a or a group represented by the following formula (II)-b:

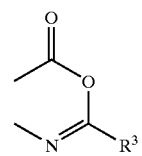

(II)-b $R^2$ and $R^3$ may be the same or different and are each a monovalent hydrocarbon residue; and $X^2$ is a tetravalent aromatic residue which may further contain a hetero atom, is used in an unreacted form.

The cyclic imino esters are known compounds as ultraviolet absorbers and are described in, for example, JP-A 59-12952.

In the above formula (I), $X^1$ is a divalent aromatic residue whose two links are at positions 1 and 2; n is 1, 2 or 3; $R^1$ is an n-valent hydrocarbon residue which may further contain a hetero atom, and $R^1$ can be a direct bond when n=2.

Preferable examples of $X^1$ include 1,2-phenylene, 1,2-naphthylene, 2,3-naphthylene, and groups represented by the following formulae:

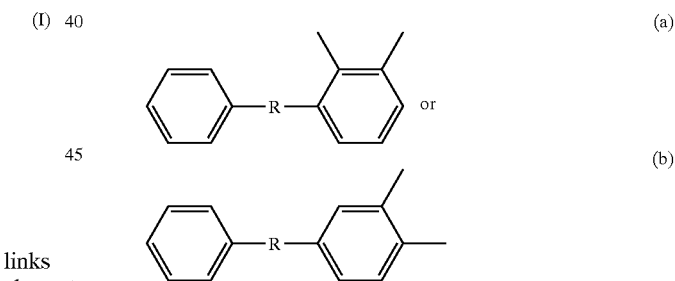

wherein R is —O—, —CO—, —S—, —SO$_2$—, —CH$_2$—, —(CH$_2$)— or —C(CH$_3$)$_2$—. Of these, 1,2-phenylene is particularly preferred.

The above exemplary aromatic residues for $X^1$ may be substituted with a substituent exemplified by an alkyl having 1 to 10 carbon atoms such as methyl, ethyl, propyl, hexyl or decyl; an aryl having 6 to 12 carbon atoms such as phenyl or naphthyl; a cycloalkyl having 5 to 12 carbon atom such as cyclopentyl or cyclohexyl; an aralkyl having 8 to 20 carbon atoms such as phenylethyl; an alkoxy having 1 to 10 carbon atoms such as methoxy, ethoxy or decyloxy; nitro; a halogen such as chlorine or bromine; an acyl having 2 to 10 carbon atoms such as acetyl, proponyl, zenzoyl or decanoyl.

$R^1$ is an n-valent (wherein n is 1, 2 or 3) hydrocarbon residue or can be a direct bond when n is 2.

A monovalent hydrocarbon residue (when n=1) can be exemplified, firstly, by an unsubstituted aliphatic group having 1 to 10 carbon atoms, an unsubstituted aromatic group having 6 to 12 carbon atoms, and an unsubstituted alicyclic group having 5 to 12 carbon atoms.

Specific examples of the unsubstituted aliphatic group having 1 to 10 carbon atoms include methyl, ethyl, propyl, hexyl and decyl. Specific examples of the unsubstituted aromatic group having 6 to 12 carbon atoms include phenyl, naphthyl and biphenyl. Specific examples of the unsubstituted alicyclic group having 5 to 12 carbon atoms include cyclopentyl and cyclohexyl.

Further, secondly, the above monovalent hydrocarbon residue can be exemplified by a group represented by the following formula (c):

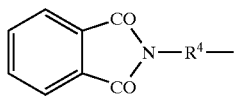

(c)

wherein $R^4$ is an alkylene having 2 to 10 carbon atoms, phenylene or naphthylene, a group represented by the following formula (d):

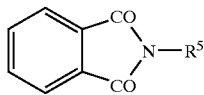

(d)

wherein $R^5$ is an alkyl group having 1 to 10 carbon atoms, phenyl group or naphthyl group, a group represented by the following formula (e):

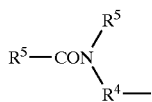

(e)

wherein $R^4$ and $R^5$ are the same as defined above, and $R^6$ is a hydrogen atom or a group defined for $R^5$, and a substituted aliphatic or aromatic residue represented by the following formula (f):

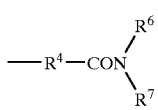

(f)

wherein $R^4$ and $R^6$ are the same as defined above, and $R^7$ is a hydrogen atom or a group defined for $R^5$.

Further, thirdly, the above monovalent hydrocarbon residue can be exemplified by groups obtained by substitution of the above unsubstituted aromatic residues with the same substituents as those enumerated as substituents for the aromatic residue represented by the above $X^1$. Thus, illustrative examples of the groups substituted with the substituents include tolyl, methylnaphthyl, nitrophenyl, nitronaphthyl, chlorophenyl, benzoylphenyl, acetylphenyl and acetylnaphthyl.

As the monovalent hydrocarbon residue, the group represented by the above formula (c), (d), (e) or (f), i.e., the substituted aliphatic or aromatic residue, is preferred. Of these, the substituted aromatic residue is particularly preferred.

A divalent hydrocarbon residue (when n=2) can be exemplified, firstly, by an unsubstituted divalent aliphatic residue having 2 to 10 carbon atoms, an unsubstituted divalent aromatic residue having 6 to 12 carbon atoms, and an unsubstituted divalent alicyclic residue having 5 to 12 carbon atoms.

Specific examples of the unsubstituted divalent aliphatic group having 2 to 10 carbon atoms include ethylene, trimethylene, tetramethylene and decamethylene. Specific examples of the unsubstituted divalent aromatic residue having 6 to 12 carbon atoms include phenylene, naphthylene and P,P'-biphenylene. Specific examples of the unsubstituted divalent alicyclic residue having 5 to 12 carbon atoms include cyclopentylene and cyclohexylene.

Further, secondly, the above divalent hydrocarbon residue can be exemplified by a group represented by the following formula (g):

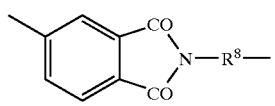

(g)

wherein $R^8$ is a group defined for $R^4$, and a substituted aliphatic or aromatic residue represented by the following formula (h):

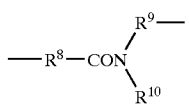

(h)

wherein $R^8$ is the same as defined above, $R^9$ is a group defined for $R^4$, and $R^{10}$ is a group defined for $R^6$.

Further, thirdly, the above divalent hydrocarbon residue can be exemplified by groups obtained by substitution of the above unsubstituted divalent aromatic residues with the same substituents as those enumerated as substituents for the aromatic residue represented by the above $X^1$.

Of these, a direct bond or the unsubstituted or substituted divalent aromatic hydrocarbon residues of the above first to third groups are preferred as $R^1$ when n is 2. Particularly preferred is an unsubstituted or substituted aromatic hydrocarbon residue of the first or third group in which two links are situated farthest apart from each other. Above all, p-phenylene, p,p'-biphenylene or 2,6-naphthylene is preferred.

A trivalent hydrocarbon residue (when n=3) can be exemplified by a trivalent aromatic residue having 6 to 12 carbon atoms.

The aromatic residue can be the following, for example.

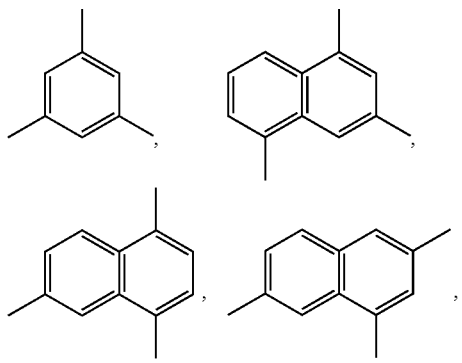

The aromatic residue may be substituted with the same substituents as those enumerated as substituents for the above monovalent aromatic residue.

In the above formula (I), $R^2$ and $R^3$ may be the same or different and are each a monovalent hydrocarbon residue, and $X^2$ is a tetravalent aromatic hydrocarbon residue.

Illustrative examples of $R^2$ and $R^3$ include the same groups as those enumerated for $R^1$ when n=1 in the description of the above formula (I).

Illustrative examples of the tetravalent aromatic hydrocarbon residue include groups represented by the following:

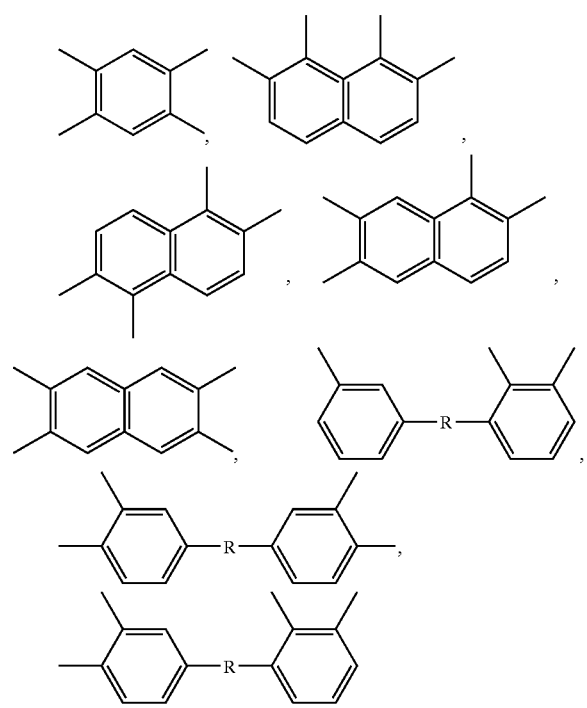

wherein R is the same as defined with respect to the formula (a).

The above tetravalent aromatic residue may be substituted with the same substituents as those enumerated as substituents for the monovalent aromatic residue represented by $R^1$ in the description of the above formula (I).

Specific examples of the cyclic imino esters represented by the above formulae (I) and (II) used in the present invention include the following compounds.

Compounds of Formula (I)

Compounds when n=1
2-methyl-3,1-benzoxazine-4-one,
2-butyl-3,1-benzoxazine-4-one,
2-phenyl-3,1-benzoxazine-4-one, 2-(1- or 2-naphthyl)-3,1-benzoxazine-4-one,
2-(4-biphenyl)-3,1-benzoxazine-4-one,
2-p-nitrophenyl-3,1-benzoxazine-4-one,
2-m-nitrophenyl-3,1-benzoxazine-4-one,
2-p-benzoylphenyl-3,1-benzoxazine-4-one,
2-p-methoxyphenyl-3,1-benzoxazine-4-one,
2-o-methoxyphenyl-3,1-benzoxazine-4-one,
2-cyclohexyl-3,1-benzoxazine-4-one, 2-p-(or m-)phthalimidephenyl-3,1-benzoxazine-4-one,
N-phenyl-4-(3,1-benzoxazine-4-one-2-yl)phthalimide,
N-benzoyl-4-(3,1-benzoxazine-4-one-2-yl)aniline,
N-benzoyl-N-methyl-4-(3,1-benzoxazine-4-one-2-yl) aniline,
and 2-(p-(N-methylcarbonyl)phenyl)-3,1-benzoxazine-4-one.

Compounds when n=2
2,2'-bis(3,1-benzoxazine-4-one),
2,2'-ethylenebis(3,1-benzoxazine-4-one),
2,2'-tetramethylenebis(3,1-benzoxazine-4-one),
2,2'-decamethylenebis(3,1-benzoxazine-4-one),
2,2'-p-phenylenebis(3,1-benzoxazine-4-one),
2,2'-m-phenylenebis(3,1-benzoxazine-4-one),
2,2'-(4,4'-diphenylene)bis(3,1-benzoxazine-4-one),
2,2'-(2,6- or 1,5-naphthylene)bis(3,1-benzoxazine-4-one),
2,2'-(2-methyl-p-phenylene)bis(3,1-benzoxazine-4-one),
2,2'-(2-nitro-p-phenylene)bis(3,1,-benzoxazine-4-one),
2,2'-(2-chloro-p-phenylene)bis(3,1-benzoxazine-4-one),
2,2'-(1,4-cyclohexylene)bis(3,1-benzoxazine-4-one),
N-p-(3,1-benzoxazine-4-one-2-yl)phenyl,
4-(3,1-benzoxazine-4-one-2-yl)phthalimide,
N-p-(3,1-benzoxazine-4-one-2-yl)benzoyl and
4-(3,1-benzoxazine-4-one-2-yl)aniline.

Compounds when n=3
1,3,5-tri(3,1-benzoxazine-4-one-2-yl)benzene,
1,3,5-tri(3,1-benzoxazine-4-one-2-yl)naphthalene and
2,4,6-tri(3,1-benzoxazine-4-one-2-yl)naphthalene.

Compounds of Formula (II)
2,8-dimethyl-4H,6H-benzo(1,2-d;5,4-d')bis(1,3)-oxazine-4,6-dione,
2,7-dimethyl-4H,9H-benzo(1,2-d;4,5-d')bis(1,3)-oxazine-4,9-dione,
2,8-diphenyl-4H,8H-benzo(1,2-d;5,4-d')bis(1,3)-oxazine-4,6-dione,
2,7-diphenyl-4H,9H-benzo(1,2-d;4,5-d')bis(1,3)-oxazine-4,6-dione,
6,6'-bis(2-methyl-4H,3,1-benzoxazine-4-one),
6,6'-bis(2-ethyl-4H,3,1-benzoxazine-4-one),
6,6'-bis(2-phenyl-4H,3,1-benzoxazine-4-one),
6,6'-methylenebis(2-methyl-4H,3,1-benzoxazine-4-one),
6,6'-methylenebis(2-phenyl-4H,3,1-benzoxazine-4-one),
6,6'-ethylenebis(2-methyl-4H,3,1-benzoxazine-4-one),
6,6'-ethylenebis(2-phenyl-4H,3,1-benzoxazine-4-one),
6,6'-butylenebis(2-methyl-4H,3,1-benzoxazine-4-one),
6,6'-butylenebis(2-phenyl-4H,3,1-benzoxazine-4-one),
6,6'-oxybis(2-methyl-4H,3,1-benzoxazine-4-one),
6,6'-oxybis(2-phenyl-4H,3,1-benzoxazine-4-one),
6,6'-sulfonylbis(2-methyl-4H,3,1-benzoxazine-4-one),
6,6'-sulfonylbis(2-phenyl-4H,3,1-benzoxazine-4-one),
6,6'-carbonylbis(2-methyl-4H,3,1-benzoxazine-4-one),
6,6'-carbonylbis(2-phenyl-4H,3,1-benzoxazine-4-one), 7,7'-methylenebis(2-methyl-4H,3,1-benzoxazine-4-one),
7,7'-methylenebis(2-phenyl-4H,3,1-benzoxazine-4-one),
7,7'-bis(2-methyl-4H,3,1-benzoxazine-4-one),
7,7'-ethylenebis(2-methyl-4H,3,1-benzoxazine-4-one),
7,7'-oxybis(2-methyl-4H,3,1-benzoxazine-4-one),
7,7'-sulfonylbis(2-methyl-4H,3,1-benzoxazine-4-one),
7,7'-carbonylbis(2-methyl-4H,3,1-benzoxazine-4-one),
6,7'-bis(2-methyl-4H,3,1-benzoxazine-4-one),
6,7'-bis(2-phenyl-4H,3,1-benzoxazine-4-one),
6,7'-methylenebis(2-methyl-4H,3,1-benzoxazine-4-one) and
6,7'-methylenebis(2-phenyl-4H,3,1-benzoxazine-4-one).

Of the above exemplary compounds, the compounds of the above formula (I) are preferably used, the compounds of the above formula (I) when n=2 are more preferably used, and compounds represented by the following formula (I)-1:

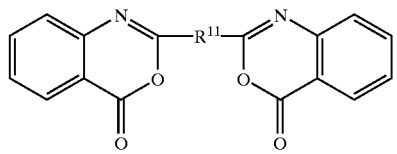

wherein $R^{11}$ is a divalent aromatic hydrocarbon residue, are particularly preferably used.

Of the compounds of the formula (I)-1,
2,2'-p-phenylenebis(3,1-benzoxazine-4-one),
2,2'-(4,4'-diphenylene)bis(3,1-benzoxazine-4-one) and
2,2'-(2,6-naphthylene)bis(3,1-benzoxazine-4-one) are particularly preferred.

As for the ultraviolet absorbability of these cyclic imino esters, descriptions about that of their representative compound in JP-A 59-12952 are used herein by reference.

The above cyclic imino esters have excellent compatibility with a polyester. Meanwhile, as described in JP-A 59-12952 and U.S. Pat. No. 4,291,152, they are capable of reacting with terminal hydroxyl groups of the polyester. Thus, it is required to mix the cyclic imino ester with the polyester carefully so as to allow the cyclic imino ester to be contained in the polyester in a substantially unreacted state. However, when a polyester whose principal terminal groups are carboxyl groups or a polyester whose terminal hydroxyl groups are blocked with a terminal blocking agent which has no reactivity with the cyclic imino ester is used as the polyester, there is no need to pay special attention to production of a composition which contains the cyclic imino ester in an unreacted state. When a polyester whose principal terminal groups are hydroxyl groups is used, it is desirable that melt-mixing of the cyclic imino ester and the polyester be completed in a short time such that the following expressions:

Log $t \leq -0.008T+4.8$, and $Tm < T < 320$ wherein t is a melt-mixing time (seconds), T is a melt-mixing temperature (° C.), and Tm is the melting temperature (° C.) of the polyester, are satisfied. In this case, there is a possibility that the cyclic imino ester and the polyester react with each other in small portions. Since the molecular weight of the polyester increases by the reaction, a decrease in the molecular weight of the polyester due to deterioration of the polyester by a visible light absorber can be prevented depending on the proportions. Further, as a result of the reaction between the cyclic imino ester and the polyester, the wavelength range of ultraviolet to be absorbed by the cyclic imino ester generally tends to be shifted to a lower wavelength side than the wavelength range of ultraviolet to be absorbed by the cyclic imino ester in an unreacted state, so that the reacted cyclic imino ester tends to allow ultraviolet of higher wavelengths to pass therethrough.

When the above cyclic imino ester is added in a proper amount, a sublimate is hardly produced, so that a die is hardly stained by film formation. Further, since it absorbs light ranging from ultraviolet to light of around 380 nm, no coloration of the film occurs. Thus, the cyclic imino ester has an excellent capability of preventing deterioration in the visible light absorber and the film.

The above ultraviolet absorber is preferably added in an amount of 0.1 to 5 wt %, more preferably 0.2 to 3 wt %, based on the polyester. When the amount is smaller than 0.1 wt %, an effect of preventing deterioration by ultraviolet light is small, while when the amount is larger than 5 wt %, the film formability of the polyester deteriorates disadvantageously.

The above ultraviolet absorber can be added to the polyester during a polyester polymerization step or kneaded into the polymer in a melting step prior to film formation or impregnated into a biaxially stretched film. In particular, in view of prevention of a decrease in the degree of polymerization of the polyester, it is preferred that the ultraviolet absorber be kneaded into the polymer in the melting step prior to film formation. In that case, the ultraviolet absorber can be kneaded into the polymer by a method of directly adding the compound in a powdery form, a masterbatch method or the like.

Coating (B)

The optical adhesive polyester film of the present invention has a coating (B) on at least one surface of the polyester layer (A). The coating (B) contains at least one of a coating polyester having a glass transition point of 40 to 100° C. and an acryl polymer having a glass transition point of 20 to 80° C.

The coating polyester has a glass transition point of 40 to 100° C., preferably 60 to 90° C. When the glass transition point is lower than 40° C., blocking of the films may occur, while when it is higher than 100° C., the coating becomes so brittle that scratches are liable to be formed and the surface of the coating is liable to become rough, thereby impairing transparency.

The polyester resin having the glass transition point can be obtained from the following polybasic acids or ester-forming derivatives thereof and polyols or ester-forming derivatives thereof.

Illustrative examples of the polybasic acid components include terephthalic acid, isophthalic acid, phthalic acid, phthalic anhydride, 2,6-naphthalenedicarboxylic acid, 1,4-cyclohexanedicarboxylic acid, adipic acid, sebacic acid, trimellitic acid, pyromellitic acid, dimer acid and 5-sodium sulfoisophthalic acid. These acid components are used in combination of two or more so as to synthesize a copolyester. Further, trace amounts of unsaturated polybasic acid component such as maleic acid or itaconic acid and hydroxycarboxylic acid such as p-hydroxybenzoic acid can also be used. Meanwhile, illustrative examples of the polyol components include ethylene glycol, 1,4-butanediol, diethylene glycol, dipropylene glycol, 1,6-hexanediol, 1,4-cyclohexanedimethanol, xylylene glycol, dimethylolpropane, poly(ethyleneoxide)glycol, poly(tetramethyleneoxide)glycol, and monomers thereof.

The above polyester is preferably a water-soluble or water-dispersible polyester. To improve water solubility or water dispersibility, it is preferable to incorporate a dicarboxylic acid having 0.1 to 15 mol % of sulfonate group, for example. Particularly, it is preferable from the viewpoints of water resistance and moisture resistance as well to use a water-dispersible polyester resin containing a dicarboxylic acid having 0.1 to 5 mol % of sulfonate group. Further, the intrinsic viscosity of the polyester is preferably 0.4 to lower than 0.7, more preferably 0.5 to 0.65. When the intrinsic viscosity is lower than 0.4, the coating has poor heat resistance, so that a problem that the surface of the coating becomes whitened when subjected to heat in a processing step is liable to occur. Meanwhile, when the intrinsic viscosity is higher than 0.7, a smooth coating is difficult to be obtained, and roughness occurs on the surface, whereby transparency is liable to deteriorate.

The polyester is contained in an amount of 50 to 95 wt %, preferably 60 to 90 wt %, more preferably 70 to 85 wt %, based on the coating. When the content of the polyester resin is higher than 90 wt %, the coating becomes so flat that it has poor blocking resistance. Meanwhile, when the content of the polyester resin is lower than 60 wt %, adhesion to a hard coat or the like deteriorates.

Further, the acryl polymer has a glass transition point of 20 to 80° C., preferably 25 to 70° C., more preferably 30 to 60° C. When Tg is lower than 20° C., the coating becomes soft, so that blocking resistance deteriorates. Meanwhile, when Tg is higher than 80° C., film formability deteriorates, and the surface of the coating becomes rough, so that the transparency of the film deteriorates.

The components of the acryl polymer comprise polymerization units of acryl monomers such as those exemplified below. Illustrative examples of such acryl monomers include alkyl acrylates and alkyl methacrylates (wherein the alkyl group is a methyl group, ethyl group, n-propyl group, isopropyl group, n-butyl group, isobutyl group, t-butyl group, 2-ethylhexyl group, cyclohexyl group or the like); hydroxyl-group-containing monomers such as 2-hydroxyethyl acrylate, 2-hydroxyethyl methacrylate, 2-hydroxypropyl acrylate and 2-hydroxypropyl methacrylate; epoxy-group-containing monomers such as glycidyl acrylate, glycidyl methacrylate and allyl glycidyl ether; monomers containing a carboxy group or a salt thereof such as acrylic acid, methacrylic acid, itaconic acid, maleic acid, fumaric acid, crotonic acid, styrenesulfonic acid and salts thereof (such as sodium salts, potassium salts, ammonium salts, tertiary amine salts and the like); monomers containing an amido group such as acrylamide, methacrylamide, N-alkylacrylamide, N-alkylmethacrylamide, N,N-dialkylacrylamide, N,N-dialkylmethacrylate (wherein the alkyl group is a methyl group, ethyl group, n-propyl group, isopropyl group, n-butyl group, isobutyl group, t-butyl group, 2-ethylhexyl group, cyclohexyl group or the like), N-alkoxyacrylamide, N-alkoxymethacrylamide, N,N-dialkoxyacrylamide, N,N-dialkoxymethacrylamide (wherein the alkoxy group is a methoxy group, ethoxy group, butoxy group, isobutoxy group or the like), acryloyl morpholine, N-methylolacrylamide, N-methylolmethacrylamide, N-phenylacrylamide and N-phenylmethacrylamide; monomers of acid anhydrides such as maleic anhydride and itaconic anhydride; and monomers such as vinyl isocyanate, allyl isocyanate, styrene, α-methylstyrene, vinyl methyl ether, vinyl ethyl ether, vinyl trialkoxysilane, alkyl maleic monoester, alkyl fumaric monoester, alkyl itaconic monoester, acrylonitrile, methacrylonitrile, vinylidene chloride, ethylene, propylene, vinyl chloride, vinyl acetate, butadiene and the like.

Of these, the hydroxyl-group-containing monomer such as 2-hydroxyethyl acrylate, 2-hydroxyethyl methacrylate, 2-hydroxypropyl acrylate, 2-hydroxypropyl methacrylate, N-methylolacrylamide or N-methylolmethacrylamide is preferably contained in an amount of 2 to 20 mol %, more preferably 4 to 15 mol %. When the content of the hydroxyl-group-containing monomer is lower than 2 mol %, adhesion to a hard coat or the like may be poor, while when it is higher than 20 mol %, a uniform coating cannot be formed due to a side reaction, so that the transparency of the film may deteriorate.

The coating may contain a filler. The filler preferably has a particle diameter of 0.02 to 0.2 μm and is contained in an amount of 0.1 to 20 wt % based on the coating. When the coating contains the coating polyester, the filler is preferably contained in an amount of 1 to 20 wt %. When the particle diameter of the filler is smaller than 0.02 μm or the content of the filler in the coating is lower than 0.1 wt %, the slipperiness of the film lowers, its handling properties are liable to deteriorate, and its blocking resistance also deteriorates. Meanwhile, when the particle diameter of the filler is larger than 0.2 μm or the content of the filler is higher than 20 wt %, the transparency of the coating lowers, thereby making the film difficult to be used for a display or other applications.

The filler is organic or inorganic fine particles. Illustrative examples of the filler include calcium carbonate, calcium oxide, aluminum oxide, kaoline, silicon oxide, zinc oxide, crosslinked acrylic resin particles, crosslinked polystyrene resin particles, melamine resin particles, and crosslinked silicone resin particles.

The refractive indices of the coating polyester or the acryl polymer and the filler are preferably 1.50 to 1.60, particularly preferably 1.55 to 1.59. When the refractive indices are lower than 1.50 or higher than 1.60, interfacial reflection between a hard coat, a base film or the resin in the coating and the filler increases, thereby impairing transparency in some cases.

Further, the coating may contain a crosslinking agent.

As the crosslinking agent, at least one selected from the group consisting of, for example, an oxazoline-group-containing polymer, an urea resin, a melamine resin and an epoxy resin is used.

The oxazoline-group-containing polymer used as the crosslinking agent can be exemplified by polymers described in JP-B 63-48884 (the term "JP-B" as used herein means an "examined published Japanese patent application") and JP-A 2-60941 and JP-A 2-99537 or polymers based on these polymers. Specific examples thereof include polymers obtained by polymerizing (a) an addition-polymerizable oxazoline represented by the following formula (III):

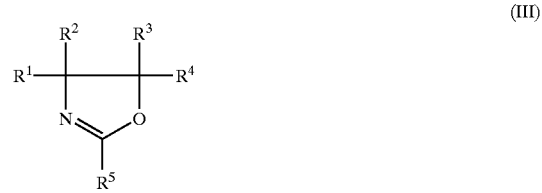

wherein $R^1$, $R^2$, $R^3$ and $R^4$ each represent a substituent selected from hydrogen, halogen, an alkyl group, an aralkyl group, a phenyl group and a substituted phenyl group, and $R^5$ represents a non-cyclic organic group having an addition-polymerizable unsaturated bonded group, and, as required, (b) a monomer other than the addition-polymerizable oxazoline.

Specific examples of the addition-polymerizable oxazoline (a) represented by the above formula (III) include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-methyl-2-oxazoline. These may be used alone or in admixture of two or more. Of these, 2-isopropenyl-2-oxazoline is industrially easy to obtain and suitable.

Meanwhile, the monomer (b) other than the addition-polymerizable oxazoline is not particularly limited as long as it is a monomer copolymerizable with the addition-polymerizable oxazoline (a). Illustrative examples of the monomer (b) include acrylic esters such as methyl acrylate, methyl methacrylate, butyl acrylate and butyl methacrylate; unsaturated carboxylic acids such as acrylic acid, methacrylic acid and itaconic acid; unsaturated nitriles such as acrylonitrile and methacrylonitrile; unsaturated amides such as acrylamide, methacrylamide, N-methylolacrylamide and N-methylolmethacrylamide; vinyl esters such as vinyl acetate and vinyl propionate; vinyl ethers such as methyl vinyl ether and ethyl vinyl ether; α-olefins such as ethylene and propylene; halogen-containing-α,β-unsaturated monomers such as vinyl chloride, vinylidene chloride and vinyl fluoride; and α,β-unsaturated aromatic monomers such as styrene and α-methylstyrene. These may be used alone or in admixture of two or more.

To obtain a polymer by use of the above addition-polymerizable oxazoline (a) and at least one of other monomers (b) as required, polymerization can be carried out by a conventionally known polymerization method. A variety of methods such as an emulsion polymerization method (method of carrying out polymerization by mixing a polymerization catalyst, water, a surfactant and monomers simultaneously), a monomer dropping method, a multistage polymerization method and a pre-emulsion method can be employed.

As the polymerization catalyst, a conventionally known polymerization catalyst can be used. For example, conventional radical polymerization initiators such as hydrogen peroxide, potassium persulfate and 2,2'-azobis(2-aminodipropane)dihydrochloride can be used.

Further, as the surfactant, conventionally known anionic, nonionic, cationic, amphoteric and reactive surfactants can be used.

The polymerization temperature is generally 0 to 100° C., preferably 50 to 80° C. Further, the polymerization time is generally 1 to 10 hours.

When a polymer is obtained by use of the addition-polymerizable oxazoline (a) and at least one of other monomers (b), the amount of the addition-polymerizable oxazoline (a) to be added is preferably determined as appropriate from a range of not smaller than 0.5 wt % based on all monomers. When the amount of the addition-polymerizable oxazoline (a) to be added is smaller than 0.5 wt %, it may be difficult to achieve the objects of the present invention disadvantageously.

Illustrative examples of the epoxy resin used as the crosslinking agent include a polyepoxy compound, a diepoxy compound and a monoepoxy compound. Specific examples of the polyepoxy compound include sorbitol polyglycidyl ether, polyglycerol polyglycidyl ether, pentaerythritol polyglycidyl ether, diglycerol polyglycidyl ether, triglycidyl tris(2-hydroxyethyl)isocyanate, glycerol polyglycidyl ether, trimethylolpropane polyglycidyl ether, N,N,N',N'-tetraglycidylmetaxylylenediamine, N,N,N',N'-tetraglycidyl-4,4'-diaminodiphenylmethane and N,N,N',N'-tetraglycidyl-1,3-bisaminomethylcyclohexane. Specific examples of the diepoxy compound include neopentyl glycol diglycidyl ether, 1,6-hexanediol diglycidyl ether, resorcin diglycidyl ether, ethylene glycol diglycidyl ether, polyethylene glycol diglycidyl ether, propylene glycol diglycidyl ether, polypropylene glycol diglycidyl ether and polytetramethylene glycol diglycidyl ether. Further, specific examples of the monoepoxy compound include allyl glycidyl ether, 2-ethylhexyl glycidyl ether and phenyl glycidyl ether. Of these, N,N,N',N'-tetraglycidylmetaxylylenediamine, N,N,N',N'-tetraglycidyl-4,4'-diaminodiphenylmethane and N,N,N',N'-tetraglycidyl-1,3-bisaminomethylcyclohexane can be used.

Illustrative examples of the urea resin used as the crosslinking agent include dimethylol urea, dimethylol ethylene urea, dimethylol propylene urea, tetramethylol acetylene urea and 4-methoxy-5-dimethylpropylene urea dimethylol.

Illustrative examples of the melamine resin used as the crosslinking agent include compounds obtained by reacting a lower alcohol such as methyl alcohol, ethyl alcohol or isopropyl alcohol with a methylol melamine derivative obtained by condensing melamine and formaldehyde so as to cause etherification, and mixtures of the compounds.

Further, illustrative examples of the methylol melamine derivative used as the crosslinking agent include monomethylol melamine, dimethylol melamine, trimethylol melamine, tetramethylol melamine, pentamethylol melamine and hexamethylol melamine.

Of these crosslinking agents, the oxazoline-group-containing polymer and the epoxy compound are preferred, and the polyepoxy compound is particularly preferred. These crosslinking agents may be used alone or in combination of two or more.

The content of the crosslinking agent is preferably 1 to 40 wt %, more preferably 3 to 30 wt %, based on the coating. When the content of the crosslinking agent is lower than 1 wt %, adhesion to a hard coat or the like may be poor due to the weak cohesion of the coating disadvantageously, while when it is higher than 40%, film formability deteriorates, and transparency may be impaired disadvantageously.

The coating (B) preferably contains:
(i) a coating polyester having a glass transition point of 40 to 100° C. and an intrinsic viscosity of 0.4 to lower than 0.7 in an amount of 60 to 90 wt % and a filler having a particle diameter of 0.02 to 0.2 μm in an amount of 1 to 20 wt % based on the coating, or
(ii) a coating polyester having a glass transition point of 40 to 100° C. in an amount of 50 to 95 wt %, a crosslinking agent in an amount of 1 to 40 wt %, and a filler having a particle diameter of 0.02 to 0.2 μm in an amount of 0.1 to 20 wt % based on the coating.

Further, the coating (B) may also contain wax. The coating (B) can obtain excellent easy slipperiness by containing the wax.

Specific examples of the wax include plant waxes such as a carnauba wax, a candelilla wax, a rice wax, a Japan wax, a jojoba oil, a palm wax, a rosin modified wax, an ouricury wax, a sugarcane wax, an esparto wax and a bark wax; animal waxes such as a beeswax, lanolin, spermaceti, a Chinese wax and a shellac wax; mineral waxes such as a montan wax, ozokerite and a ceresin wax; petroleum waxes such as a paraffin wax, a microcrystalline wax and petrolatum, synthetic hydrocarbon waxes such as a Fischer Tropsch wax, a polyethylene wax, a polyethylene oxide wax, a polypropylene wax and a polypropylene oxide wax; and fatty acid amides or bisamides such as N,N'-methylenebisstearic acid amide, N,N'-ethylenebispalmitic acid amide, N,N'-methylenebislauric acid amide, linolic acid amide, caprylic acid amide and stearic acid amide. The wax is more preferably a water dispersant in view of environmental issues and ease of handling.

The wax is contained in the coating in an amount of preferably 0.5 to 20 wt %, more preferably 1 to 10 wt %, based on the coating. When the content of the wax falls within the range, adhesion to a polyester base material or easy adhesion to a hard coat or the like can be attained while the easy slipperiness of the surface of the film is retained.

When the coating contains wax, it preferably contains 60 to 90 wt % of coating polyester, 1to 20 wt %, more preferably 1 to 9 wt % of filler, and 0.5 to 20 wt %, more preferably 1 to 9 wt % of the wax.

The coating preferably has a surface resistivity of not higher than $1 \times 10^{14}$ Ω/□. When the surface resistivity is higher than $1 \times 10^{14}$ Ω/□, electrification is liable to occur during transportation of the film in a processing step or the like, whereby the handling of the film may deteriorate. A preferable example of a method to adjust the surface resistivity of the coating comprises adding a known antistatic agent.

Further, the coating preferably has a surface energy of lower than 50 mN/m. When the surface energy is equal to or higher than 50 mN/m, the adhesion of the film to a hard coat or an adhesive may be insufficient.

In addition to the above components, other resins such as an urethane resin, an acrylic resin, an epoxy resin and a melamine resin, a colorant, a surfactant, an ultraviolet absorber and the like can be used as components forming the coating in the present invention, in such amounts that do not impair the properties of the coating.

Production of Optical Adhesive Polyester Film

In the present invention, the coating using the above components is formed on at least one surface of a polyester film which serves as the polyester film layer (A). For example, the coating can be formed by applying an aqueous solution which contains the components forming the coating on a stretchable polyester film, drying and stretching the film, and heat-treating the stretched film as required. The solid content of the aqueous solution is generally not higher than 30 wt %, preferably not higher than 10 wt %.

The above stretchable polyester film may be an unstretched polyester film, a monoaxially stretched polyester film or a biaxially stretched polyester film. Of these, a longitudinally stretched polyester film which has been monoaxially stretched in the direction of extrusion (longitudinal direction) is particularly preferred.

To apply the aqueous coating solution to the film, it is preferred to subject the surface of the film to a physical treatment such as a corona surface treatment, a flame treatment or a plasma treatment as a pretreatment to improve coatability, or use a combination of a composition and a surfactant which is chemically inert to the composition.

The surfactant promotes wetting of the aqueous coating solution to the polyester film. Illustrative examples of the surfactant include anionic and nonionic surfactants such as a polyoxyethylene alkyl phenyl ether, a polyoxyethylene-fatty ester, a sorbitan fatty ester, a glycerin fatty ester, a fatty acid metallic soap, an alkylsulfate, an alkylsulfonate and an alkylsulfosuccinate. The surfactant is preferably contained in the composition forming the coating in an amount of 1 to 10 wt %. When the content of the surfactant is within the above range, the coating can have a surface energy of not higher than 40 mN/m, and repellency on the coating layer can be prevented accordingly.

When the aqueous solution is coated on the polyester film in a conventional coating step, i.e., in a step separate from a film production step of the biaxially stretched and heat-set polyester film, debris, dust and the like are liable to be contained in the coated solution disadvantageously. Thus, it is preferable to apply the aqueous solution in a clean atmosphere, i.e., in the film production step. This application of the aqueous solution further improves the adhesion of the coating (coating film) to the polyester film.

To apply the aqueous solution, any known coating method can be employed. For example, a roller coating method, a gravure coating method, a roll brush method, a spray coating method, an air knife coating method, an impregnation method and a curtain coating method can be used alone or in combination. The amount of application is preferably 0.5 to 20 g, more preferably 1 to 10 g, per m² of the running film. The aqueous solution is preferably used as a water dispersion or emulsified liquid. The coating film may be formed on one or both surfaces of the film as required.

After application of the aqueous solution, the stretchable polyester film is subjected to a drying and stretching step. The step can be carried out under conditions which have been heretofore accumulated in the art. As for preferred conditions, for example, the drying condition is 90 to 130° C.×2 to 10 seconds, the stretch temperature is 90 to 130° C., the stretch ratio in a longitudinal direction is 3 to 5 times, the stretch ratio in a transverse direction is 3 to 5 times, and the stretch ratio in the longitudinal direction for second longitudinal stretching which is carried out as required is 1 to 3 times, and the heat-setting condition is 180 to 240° C.×2 to 20 seconds.

After completion of the step, the biaxially oriented polyester film preferably has a thickness of 50 to 250 μm, and the coating film has a thickness of 0.02 to 1 μm.

Next, a description will be given to an optical adhesive polyester film of the present invention wherein the polyester film layer (A) comprises a plurality of laminated layers.

Aromatic Polyester and Polyester Film Layer (A)

Hereinafter, a polyester film layer (A) comprising a plurality of laminated layers is referred to as a laminated polyester film (A) or a laminated polyester film layer (A). It is to be understood that for what is not described in this section, what has been described in the previous section about the polyester film layer (A) comprising a single layer is applied directly or with some self-evident modifications made by those skilled in the art.

The plurality of layers, preferably at least 3 layers constituting the laminated polyester film layer are melt-extruded from a mouthpiece by a coextrusion method, stretched, and heat-set as required. Hereinafter, a film having a three-layered structure will be described as the laminated polyester film. However, the laminated polyester film is not limited to the three-layer polyester film as long as the same objects are achieved and may comprise two layers or more than three layers. Due to the plurality of layers constituting the laminated polyester film, it becomes easy to balance transparency and scratch resistance.

In the laminated polyester film (A), outermost layers are layers constituting two surfaces exposed immediately after extruded from the mouthpiece, and a layer other than these layers is referred to as an inner layer (intermediate layer). An aromatic polyester constituting the inner layer and the outermost layers preferably has an intrinsic viscosity VI (o-chlorophenol, 35° C.) of 0.45 to 0.80, more preferably 0.50 to 0.75, much more preferably 0.55 to 0.70. When the IV value is lower than 0.45, the excellent properties of the polyester film such as heat resistance and mechanical strength are liable to deteriorate. Meanwhile, when the IV value is higher than 0.80, a load in the extrusion step at the time of production of the polyester film is liable to be so high that productivity may lower.

The thickness of the laminated polyester film (A) is preferably 50 $\mu$m to 200 $\mu$m, more preferably 75 $\mu$m to 175 $\mu$m. When the thickness is smaller than 50 $\mu$m, the elasticity of the film is not sufficient, so that flatness is liable to be degraded and scratches are liable to be produced during processing. Meanwhile, when the thickness is larger than 200 $\mu$m, the film becomes so elastic that processability thereof is poor and transparency thereof deteriorates disadvantageously. The thickness of the outermost layer of the laminated film is preferably 0.5 $\mu$m to 30 $\mu$m, more preferably 1 $\mu$m to 20 $\mu$m. When the thickness is smaller than 0.5 $\mu$m, an ultraviolet absorber contained in the inner layer is liable to be permeated and deposited, so that a production line is liable to be contaminated disadvantageously. Meanwhile, when the thickness is larger than 30 $\mu$m, a haze value ascribable to filler particles which are preferably added in the outermost layer films for improving the windability and scratch resistance of the film becomes high, so that the transparency of the film is liable to deteriorate. The thickness of at least one inner layer containing an ultraviolet absorber is preferably 30 $\mu$m to 190 $\mu$m, more preferably 20 $\mu$m to 170 $\mu$m. When the thickness is smaller than 20 $\mu$m, the film has a poor ultraviolet absorbing capability, while when the thickness is larger than 190 $\mu$m, the ultraviolet absorber causes a deterioration in transparency disadvantageously.

The laminated polyester film (A) preferably has a center line surface roughness Ra of 3 nm to 30 nm, more preferably 5 nm to 20 nm. When Ra is smaller than 3 nm, the coefficient of friction of the surface of the film becomes high, so that handling properties and scratch resistance deteriorate disadvantageously. Meanwhile, when Ra is larger than 30 nm, the surface of the film becomes rough, so that reflection on the surface increases, and total light transmittance decreases disadvantageously.

As a method of adjusting the roughness to this range, a method of adding inert fine particles to the outermost layer of the laminated polyester film is preferably used. The inert particles to be added to the outermost layer preferably have an average particle diameter of 0.01 $\mu$m to 2.0 $\mu$m, more preferably 0.1 $\mu$m to 1.0 $\mu$m. Further, the content of the particles in the outermost layer is preferably 0.003 to 0.5 wt %, more preferably 0.005 to 0.1 wt %.

The content of inert particles in the inner layer of the laminated polyester film is preferably lower than that of the outermost layer and is more preferably not higher than 0.1 wt % from the viewpoint of transparency. The type of the inert particles contained in the inner layer may be the same as or different from that of the inert particles contained in the outermost layer, and the inert particles contained in the inner layer may be of one type or of two or more types. The inert particles contained in the inner layer preferably have an average particle diameter of not larger than 2.0 $\mu$m, more preferably not larger than 1.0 $\mu$m. When the average particle diameter is larger than 2.0 $\mu$m, transparency may be impaired.

Any layer in the laminated polyester film may contain a colorant, an antistatic agent, an antioxidant, a lubricant, a catalyst, and other resins such as a polyethylene, a polypropylene, an ethylene-propylene polymer and an olefinic ionomer in such amounts that do not impair transparency, in addition to the inert particles.

The laminated polyester film must have heat shrinkage rates in a continuous film formation direction (longitudinal direction) and a direction (width direction) perpendicular to the continuous film formation direction at 150° C. of not higher than 2.0%, preferably not higher than 1.5%. When the heat shrinkage rate in the longitudinal direction at 150° C. exceeds 2.0%, the adhesion of the film to a hard coat layer lowers at the time of drying of a hard coating agent in a hard coat treatment step, due to a difference in shrinkability between the film and the hard coat layer. Further, when the film passes through a process involving heating at the time of processing, wrinkles and curls occur and flatness deteriorates disadvantageously. A method of adjusting the heat shrinkage rates of the polyester film is not particularly limited, and a known method can be used. Illustrative examples of such a method include a method comprising causing the film to shrink in a heat treatment step as described in JP-A 57-57628 and a method comprising subjecting the film to a relaxation treatment in a suspended position as described in JP-A 1-275031.

The laminated polyester film preferably has a haze of not higher than 3%, more preferably not higher than 2%. When the haze is higher than 3%, visibility may be impaired in various display applications, making the film unsuitable for optical applications. Further, the laminated polyester film preferably has a total light transmittance of not lower than 80%. When the total light transmittance is lower than 80%, the visibility of the display lowers disadvantageously.

Further, the laminated polyester film preferably has a refractive index in a thickness direction of 1.490 to 1.505, more preferably 1.493 to 1.502. When the refractive index is lower than 1.490, delamination is liable to occur, so that adhesion to a hard coat layer is liable to be insufficient when the film is used as an optical film. Meanwhile, when the refractive index is higher than 1.505, transparency is liable to be impaired. Further, flatness deteriorates disadvantageously. Further, the refractive index in a longitudinal direction is preferably 1.620 to 1.680, more preferably 1.630 to 1.670. In addition, the refractive index in a width direction is preferably 1.640 to 1.700, more preferably 1.650 to 1.690. When the refractive indices are out of these ranges, it becomes difficult to control the refractive index in the thickness direction to the above range.

The laminated polyester film layer (A) preferably contains an ultraviolet absorber at least in the intermediate layer or inner layer.

When an ultraviolet absorber is added to the outermost layers, a phenomenon (bleed out) that the added ultraviolet absorber bleeds out on the surface of the film and a phenomenon that the bled-out ultraviolet absorber sublimates are liable to occur, whereby a film producing device is liable to be contaminated and the bled-out agent on the surface layer of the film causes an adverse effect in a processing step disadvantageously.

The above ultraviolet absorber is preferably added to the inner layer in an amount of 0.1 to 5 wt %, more preferably 0.2 to 3 wt %. When the amount is smaller than 0.1 wt %, an effect of preventing deterioration by ultraviolet light is small, while when it is larger than 5 wt %, a so-called bleed out phenomenon that the ultraviolet absorber seeps through the external layers covering the inner layer and is deposited in a trace amount on the surface of the film is liable to occur disadvantageously.

The laminated polyester film can be produced by a conventionally known successive biaxially stretching method, simultaneous biaxially stretching method, inflation method or the like. In the successive biaxially stretching method and the simultaneous biaxially stretching method, after polyester chips of given composition are fully dried, a plurality of extruders and a multilayered multimanifold die or feed block are used so as to laminate polyester films and extrude a multilayered molten sheet from a mouthpiece, and the sheet is then quenched and solidified on a casting drum preset at about 20 to 40° C. so as to obtain an unstretched film. The thus obtained unstretched film preferably has a thickness of not smaller than 0.5 mm. Then, the unstretched film is biaxially stretched under generally well known conditions. To have the heat shrinkage rates and the refractive indices within desired ranges, the unstretched film is preferably stretched to 3.0 to 4.5 times in the continuous film formation direction (longitudinal direction) of the film, to 3.0 to 4.5 times in the direction (transverse direction) perpendicular to the continuous film formation direction, i.e., to 9 to 20 times in terms of area ratio. The stretch temperature is preferably 90 to 140° C. Further, after biaxially stretched, the stretched film may be heat-set as required. The heat setting temperature is preferably 180 to 250° C., more preferably 210 to 240° C.

The film of the present invention which has the laminated polyester film layer (A) has a light transmittance at 370 nm of preferably not higher than 3%, more preferably not higher than 2%. When the light transmittance is higher than 3%, weather resistance to ultraviolet light is insufficient, and deterioration in an infrared absorber layer occurs when the film is used as a filter for the front panel of a plasma display, for example.

In the optical adhesive polyester film of the present invention, the center line surface roughness Ra of the coating (B) is preferably 1 nm to 10 nm when the polyester film layer (A) comprises a single layer, and the center line surface roughness Ra of the coating (B) is preferably 3 nm to 30 nm when the polyester film layer (A) comprises a plurality of laminated layers.

By taking advantage of various properties as described above, the optical adhesive polyester film of the present invention is suitably used for blocking externally incoming ultraviolet light by being disposed at the front of a plasma display, i.e., for blocking externally incoming ultraviolet light by being disposed at the front of a plasma display and the outside of a near-infrared-absorber-containing layer so as to prevent deterioration of the near infrared absorber in the near-infrared-absorber-containing layer disposed at the front of the plasma display by the externally incoming ultraviolet light.

EXAMPLES

Hereinafter, the present invention will be further described with reference to Examples. Further, property values were measured in the following manners.

(1) Haze Value

The haze value of a film was measured by use of a haze meter (NDH-20) of Nippon Denshoku Industries Co., Ltd. The haze of the film was evaluated in accordance with the following criteria.

◎: haze value≦1.5% . . . The haze of the film is very good.
○: 1.5%<haze value≦3.0% . . . The haze of the film is good.
X: 3.0%<haze value . . . The haze of the film is poor.

(2) Scratch Resistance in Film Production

Scratches in an area of 4 m² on a coating layer of a film immediately after its production were visually observed by use of reflected light of a fluorescent lamp and a halogen lamp. Any scratches found were marked with a marker, and lengths, widths and depths thereof were measured by use of a laser optical microscope (VF-750) of KEYENCE CORPORATION. The number of scratches having a length of not smaller than 1 mm, a width of not smaller than 0.5 mm and a depth of not smaller than 0.5 μm was determined.

◎: No scratches having a length of not smaller than 1 mm, a width of not smaller than 0.5 mm and a depth of not smaller than 0.2 μm . . . Very good
○: No scratches having a length of not smaller than 1 mm, a width of not smaller than 0.5 mm and a depth of not smaller than 0.5 μm . . . Good
X: At least one scratch having a length of not smaller than 1 mm, a width of not smaller than 0.5 mm and a depth of not smaller than 0.5 μm . . . Bad (3) Adhesion Hard Coat A hard coat layer having a thickness of 10 μm was formed on a coating film formed on a surface of an adhesive polyester film and cut in a cross-cut pattern (consisting of 100 grids each having a size of 1 mm²). An adhesive cellophane tape (manufactured by Nichiban Co., Ltd.) having a width of 24 mm was then stuck on the hard coat layer and peeled abruptly at an angle of 180°. Then, the peeled surface was observed and evaluated in accordance with the following criteria.

5: Peeled area is smaller than 10% . . . Adhesion is very good.
4: Peeled area is 10% to smaller than 20% . . . Adhesion is good.
3: Peeled area is 20% to smaller than 30% . . . Adhesion is rather good.
2: Peeled area is 30% to smaller than 40% . . . Adhesion is poor.
1: Peeled area is 40% or larger . . . Adhesion is very poor.

Adhesive (PSA)

An adhesive (PSA) layer having a thickness of 20 μm was formed on a coating film formed on a surface of an adhesive polyester film which was then stuck to float glass such that the adhesive layer made contact with the float glass. Then, these were left to stand at 23° C. and 65% RH for one day, and then the film was peeled at a peel angle of 90°. A state of the adhesive (PSA) remaining on the surface of the glass was observed and evaluated in accordance with the following criteria.

5: Adhesive (PSA) remaining area is smaller than 10% . . . Adhesion is very good.
4: Adhesive (PSA) remaining area is 10% to smaller than 20% . . . Adhesion is good.
3: Adhesive (PSA) remaining area is 20% to smaller than 30% . . . Adhesion is rather good.
2: Adhesive (PSA) remaining area is 30% to smaller than 40% . . . Adhesion is poor.
1: Adhesive (PSA) remaining area is 40% or larger . . . Adhesion is very poor.

(4) Blocking Resistance

Two films were stacked such that a surface of one of the films on which a coating film was formed made contact with a surface of the other film on which no coating film was formed. To the stacked films, a pressure of 0.6 kg/cm² was applied at 60° C. and 80% RH for 17 hours. Then, the films were peeled away from each other, and based on the peeling strength, blocking resistance was evaluated in accordance with the following criteria.
⊚: peeling strength<98 mN/5 cm . . . Blocking resistance is very good.
○: 98 mN/5 cm≦peeling strength<147 mN/5 cm . . . Blocking resistance is good.
Δ: 147 mN/5 cm≦peeling strength<196 mN/5 cm . . . Blocking resistance is rather good.
X: 196 mN/5 cm≦peeling strength . . . Blocking resistance is poor.

(5) Second Order Transition Point (Tg)
This was measured at a temperature increasing rate of 20° C./min by use of a differential calorimeter Thermal Analyst 2000 of Du Pont Co., Ltd.

(6) Intrinsic Viscosity
The viscosity of a solution based on an o-chlorophenol solvent was measured at 35° C.

(7) Weather Resistance
As in the case of evaluation of the easy adhesion, a hard coat layer having a thickness of 10 μm was formed on a coating film formed on a surface of an adhesive polyester film. This sample was exposed to a sunshine weather meter (WEL-SUN-HCL, product of SUGA TEST INSTRUMENTS CO., LTD.) for 1,000 hours (equivalent to one-year outdoor exposure) in accordance with JIS-K-6783b so as to conduct an outdoor exposure accelerated test. After completion of the exposure, the haze value of the film was measured by use of a haze meter (NDH-20) of Nippon Denshoku Industries Co., Ltd. The haze of the film was evaluated in accordance with the following criteria.
⊚: haze value≦2.0% . . . The haze of the film is very good.
○: 2.0%<haze value≦3.5% . . . The haze of the film is good.
X: 3.5%<haze value . . . The haze of the film is poor.

(8) Coefficient of Friction (μs)
A coefficient of static friction (μs) between a surface having a coating film formed thereon and a polyethylene terephthalate film (surface having no coating film formed thereon) was measured in accordance with ASTM D1894-63 by use of a slipperiness measuring device of Toyo Tester Industries Co., Ltd. A glass board was used as a thread board, and a load of 1 kg was used. The slipperiness of the film was evaluated in accordance with the following criteria.
⊚: friction coefficient (μs)≦0.5 . . . Slipperiness is very good.
○: 0.5<friction coefficient (μs)≦0.8 . . . Slipperiness is good.
X: 0.8<friction coefficient (μs) . . . Slipperiness is poor.

(9) Surface Resistivity Value
A surface resistivity value (Ω/□) after application of 500 V for 1 minute was measured at a measuring temperature of 23° C. and a measuring humidity of 60% by use of a resistivity measuring device of TAKEDA RIKEN CO., LTD.

(10) Heat Resistance
After a film was heat-treated at 120° C. for 60 minutes, the haze value of the film was measured in the same manner as in the above (1). The haze of the film was evaluated in accordance with the following criteria.
⊚: haze value≦2.0% . . . The heat resistance of the film is very good.
○: 2.0%<haze value≦3.5% . . . The heat resistance of the film is good.
X: 3.5%<haze value . . . The heat resistance of the film is poor.

(11) Particle Diameter
A small piece of sample film was fixed on a sample stage for a scanning electron microscope. The surface of the film was ion-etched by means of a sputtering apparatus (product of JEOL, trade name "JIS-1100 ion sputtering apparatus") and observed by use of a high resolution field emission type scanning electron microscope at a magnification of 10,000 to 30,000 times. The area equivalent particle diameters of 50 particles were determined by means of LUZEX FS of NIRECO CORPORATION, and a number average value thereof was taken as an average particle diameter.

(12) Refractive Index
The refractive index of a film was determined by use of an Abbe refractometer and a sodium D line (589 nm) as a light source.

(13) Heat Shrinkage Rate
A film having an accurately measured length of about 30 cm and a width of 1 cm was put in a thermostatic chamber set at 150° C. under no load and kept in the chamber for 30 minutes. Then, the film was taken out of the chamber and allowed to cool to room temperature, and a change in the dimension of the film was read. Based on the length (L0) of the film before the heat treatment and a degree of its dimensional change (ΔL) caused by the heat treatment, a heat shrinkage rate was determined from the following expression:

Heat Shrinkage Rate (%)=(ΔL/L0)X 100

(14) Surface Roughness Ra
Ra was measured by use of a three dimensional roughness meter (product of Kosaka Laboratory Ltd., trade name "SE-3CK") with a needle diameter of 2 μmR, a needle pressure of 30 mg, a measured length of 1 mm, a sampling pitch of 2 μm, a cutoff of 0.25 mm, a magnification in a longitudinal direction of 20,000 times, a magnification in a transverse direction of 200 times, and 100 scans. When a coating layer was formed on both surfaces, Ras of both surfaces were measured, and an average thereof was determined.

(15) 370 nm Light Transmittance
Light transmittance at wavelengths of 300 nm to 500 nm was measured continuously by means of a double beam spectrophotometer (product of Shimadzu Corporation, trade name "UV-3101PC") with a slit width of 20 nm, a medium scanning rate and a sampling pitch of 1 nm, and light transmittance at a wavelength of 370 nm was detected and evaluated in accordance with the following criteria.
○: lower than 3%
Δ: 3% to lower than 5%
X: 5% or higher

(16) Lamination Thickness of Film
A small piece of film was fixed by an epoxy resin and cut by means of a microtome, and the cross section of the film was photographed by means of a transmission electron microscope (product of JEOL, trade name "JEM2010"). In the cross section, two interfaces were observed nearly parallel to the surface of the film by variations of light and shade. The distances between the surface of the film and the two interfaces were determined from 10 photographs, and an average of the measurements was taken as a lamination thickness.

(17) Scratch Resistance
An optical adhesive film slit to a width of 100 mm was run on a hard-chrome-plated free roll (surface roughness: 100 nm in terms of Ra) having a diameter of 100 mm and a rotational resistance of 1 kg by use of a film transportability testing machine at a running speed of 10 m/min, a winding angle of 90° and a running tension of 20 kg. Scratches made on the surface of the film by this treatment were observed under a microscope after platinum deposition, and the number of scratches having a width of not smaller than 2 μm and a length of not smaller than 300 μm in an area of 0.4 m² was counted and evaluated in accordance with the following criteria.

○: less than 10 scratches
Δ: 10 to less than 20 scratches
X: 20 scratches or more

(18) Coefficient of Friction (μs)

A glass plate was fixed under two laminated films. The lower film (film in contact with the glass plate) out of the laminated films was pulled by a low-speed roll (at about 10 cm/min), and a detector was fixed to one end (end opposite to the direction in which the lower film was pulled) of the upper film so as to detect a tensile force between the films at the start. At that time, a thread having a weight of 1.5 kg and a lower area of 75 cm² was used.

The coefficient of friction (μs) was determined from the following expression.

μs=tensile force at start (kg)/load of 1 kg

The coefficient of friction was evaluated in accordance with the following criteria.
○: less than 0.4
Δ: 0.4 to less than 0.6
X: 0.6 or more

(19) Adhesion (αMethod)

A hard coat agent (product of Dainichiseika Color & Chemicals Mfg. Co., Ltd., trade name "SEIKA BEAM EXF01 (B)") was coated on a coating film formed on a surface of a laminated polyester film by means of a #8 wire bar, dried at 70° C. for 1 minute so as to remove a solvent therefrom, and irradiated with a radiation of 200 mJ/cm² from a high-pressure mercury-vapor lamp at an irradiation distance of 15 cm and a running speed of 5 m/min so as to form a hard coat layer having a thickness of 5 μm. The adhesion of the obtained film was determined by a testing method according to the description in 8.5.1 of JIS-K5400. More specifically, 100 cuts penetrating the coating layer and reaching the base film were made in a grid pattern by use of a cutter guide having a gap width of 1 mm. Then, an adhesive cellophane tape (product of Nichiban Co., Ltd., No.405, width: 24 mm) was stuck on the surface cut in a grid pattern, rubbed by an eraser so as to be completely stuck on the surface, and peeled abruptly at a peel angle of 180°. Then, the peeled surface was observed and evaluated in accordance with the following criteria.
○: Peeled area is smaller than 30%.
Δ: Peeled area is 30% to smaller than 50%.
X: Peeled area is larger than 50%.

(20) Adhesion (βMethod)

A peeled surface was evaluated in the same manner as in the adhesion (a method) except that after formation of a hard coat layer, the film was stored at 50° C. and 90% RH for 5 days, and an abrupt peeling test using an adhesive cellophane tape was then carried out.

(21) Weather Resistance–1

A solution obtained by adding 0.1 parts by weight of diimonium-based near infrared absorber (product of NIPPON KAYAKU CO., LTD., trade name "IRG-022") to 50 parts by weight of polyester binder "BYRON 20SS" (product of TOYOBO CO., LTD.) and diluting the mixture with 15 parts by weight of toluene and 35 parts by weight of methyl ethyl ketone was applied and dried on a laminated polyester film so as to form a near infrared absorbing layer having a thickness of 3 μm. Subsequently, this sample was exposed to a sunshine weather meter (product of SUGA TEST INSTRUMENTS CO., LTD., trade name "WEL-SUN-HCL") for 200 hours in accordance with paragraph 6.8 of JIS-K-6783. Then, this sample was set at a remote control light-receptive spot of a household television, and it was tested whether the household television responded to remote control signals (having signal wavelengths of 950 nm and 850 nm) when one sent the remote control signals to the television 2 m away from the television by use of a remote controller. Since near infrared light emitted from a PDP display is weaker than near infrared light emitted from the remote controller, the occurrence of malfunctions caused by the remote controller can be prevented if no responses are observed in this test. Films which did not respond to the remote controller were rated as "○", and films which responded to the remote controller were rated as "X"

(22) Weather Resistance–2

As in the case of evaluation of the adhesion, a hard coat layer having a thickness of 5 μm was formed on a laminated polyester film. This sample was exposed to a sunshine weather meter (WEL-SUN-HCL, product of SUGA TEST INSTRUMENTS CO., LTD.) for 1,000 hours (equivalent to one-year outdoor exposure) in accordance with JIS-K-6783b so as to carry out an outdoor exposure accelerated test. After completion of the exposure, the haze value of the film was measured by use of a haze meter (NDH-2000) of Nippon Denshoku Industries Co., Ltd. A difference in the haze value between before and after the treatment was determined and evaluated in accordance with the following criteria.
○: less than 1.0%
Δ: 1.0% to less than 2.0%.
X: 2.0% or more.

Examples 1 to 4 and Comparative Examples 1 to 6

Polyethylene terephthalates (intrinsic viscosity: 0.62) containing 1 wt % of ultraviolet absorber represented by the following formula (A) were melt-extruded onto a rotary cooling drum kept at 20° C. so as to form unstretched films.

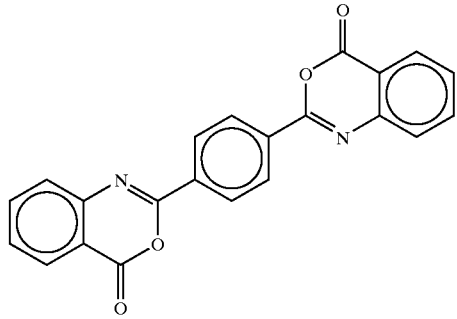

(A)

Then, after the films were stretched to 3.4 times in a longitudinal direction, both surfaces of the films were uniformly coated with 8% aqueous coating solutions of the following compositions for coating films (Table 1) by use of a roller coater.

TABLE 1

|  | Polyester | | Crosslinking Agent | | Filler | | Additive | Wetting Agent |
|---|---|---|---|---|---|---|---|---|
|  | Type | Wt % | Type | Wt % | Type | Wt % | Wt % | Wt % |
| Ex. 1 | A-1 | 70 | B-1 | 20 | C-1 | 3 | 2 | 5 |
| C. Ex. 1 | A-1 | 45 | B-1 | 45 | C-1 | 3 | 2 | 5 |
| Ex. 2 | A-2 | 70 | B-2 | 5 | C-2 | 18 | 2 | 5 |
| C. Ex. 2 | A-2 | 96 | B-2 | 0.5 | C-2 | 0.5 | — | 3 |
| Ex. 3 | A-1 | 70 | B-3 | 15 | C-2 | 8 | 2 | 5 |
| Ex. 4 | A-1 | 55 | B-4 | 35 | C-2 | 3 | 2 | 5 |
| C. Ex. 3 | A-3 | 70 | B-1 | 20 | C-1 | 3 | 2 | 5 |
| C. Ex. 4 | A-4 | 70 | B-1 | 20 | C-1 | 3 | 2 | 5 |
| C. Ex. 5 | A-2 | 70 | B-2 | 8 | C-3 | 15 | 2 | 5 |
| C. Ex. 6 | A-1 | 70 | B-1 | 20 | C-4 | 3 | 2 | 5 |

Ex.: Example,
C. Ex.: Comparative Example

Polyester A-1: Polyester (Tg=80° C.) comprising, as acid components, 65 mol % of 2,6-naphthalenedicarboxylic acid, 30 mol % of isophthalic acid and 5 mol % of 5-sodium sulfoisophthalic acid and, as glycol components, 90 mol % of ethylene glycol and 10 mol % of diethylene glycol.

Polyester A-2: Polyester (Tg=43° C.) comprising, as acid components, 80 mol % of terephthalic acid, 15 mol % of isophthalic acid and 5 mol % of 5-sodium sulfoisophthalic acid and, as glycol components, 60 mol % of ethylene glycol and 40 mol % of diethylene glycol.

Polyester A-3: Polyester (Tg=25° C.) comprising, as acid components, 80 mol % of terephthalic acid, 15 mol % of isophthalic acid and 5 mol % of 5-sodium sulfoisophthalic acid and, as glycol components, 5 mol % of ethylene glycol and 90 mol % of 1,4-butanediol.

Polyester A-4: Polyester (Tg=105° C.) comprising, as acid components, 85 mol % of 2,6-naphthalenedicarboxylic acid, 10 mol % of isophthalic acid and 5 mol % of 5-sodium sulfoisophthalic acid and, as glycol components, 90 mol % of ethylene glycol and 10 mol % of diethylene glycol.

Crosslinking Agent B-1: Polymer (Tg=50° C.) having an oxazoline group and comprising 30 mol % of methyl methacrylate, 30 mol % of 2-isopropenyl-2-oxazoline, 10 mol % of polyethylene oxide (n=10) methacrylate and 30 mol % of acrylamide.

Crosslinking Agent B-2: Epoxy resin, i.e., N,N,N',N'-tetraglycidylmetaxylylenediamine Crosslinking Agent B-3: Melamine resin, i.e., trimethoxymethylmelamine (trimethylolmelamine etherified by methanol)

Crosslinking Agent B-4: Dimethylol ethylene urea

Filler C-1: Crosslinked acryl filler (100 nm)
Filler C-2: Silica filler (20 nm)
Filler C-3: Crosslinked acryl filler (15 nm)
Filler C-4: Crosslinked acryl filler (250 nm)
Additive: Carnauba wax
Wetting Agent: Polyoxyethylene (n=7) lauryl ether Then, the coated films were dried at 95° C., stretched to 3.7 times in a transverse direction at 120° C., caused to shrink for 3% in a width direction at 220° C. and then heat-set so as to obtain laminated films having a thickness of 188 μm. The coating films had a thickness of 0.15 μm. The results of evaluations of these laminated films are shown in Table 2.

Comparative Example 7

The procedure of Example 1 was repeated except that the aqueous solution was not applied. The properties of the obtained biaxially oriented polyester film are shown in Table 2.

Examples 5 and 6 and Comparative Example 8

Laminated films were obtained in the same manner as in Example 1 except that a polyester containing 1 wt % of ultraviolet absorber represented by the following structural formula (B) was used in Example 5, a polyester containing 1 wt % of ultraviolet absorber represented by the following structural formula (C) was used in Example 6, and a polyester containing no ultraviolet absorber was used in Comparative Example 8. The properties of the obtained laminated films are shown in Table 2.

TABLE 2

|  | Haze | Scratch Resistance | Adhesive Property | | Blocking Resistance | Weather Resistance - 1 | Overall Evaluation |
|---|---|---|---|---|---|---|---|
|  |  |  | α | β |  |  |  |
| Ex. 1 | ⊙ | ⊙ | 5 | 5 | ⊙ | ⊙ | ⊙ |
| C. Ex. 1 | ⊙ | X | 5 | 5 | ⊙ | ⊙ | X |
| Ex. 2 | ○ | ○ | 5 | 4 | ○ | ○ | ○ |
| C. Ex. 2 | ⊙ | X | 4 | 3 | ○ | ⊙ | X |
| Ex. 3 | ○ | ⊙ | 4 | 4 | ⊙ | ○ | ○ |
| Ex. 4 | ⊙ | ○ | 4 | 4 | ⊙ | ⊙ | ○ |
| C. Ex. 3 | ⊙ | ○ | 5 | 5 | X | ⊙ | X |
| C. Ex. 4 | ⊙ | X | 5 | 4 | ⊙ | ⊙ | X |
| C. Ex. 5 | ○ | X | 5 | 5 | ○ | ○ | X |
| C. Ex. 6 | X | ⊙ | 5 | 5 | ⊙ | X | X |
| C. Ex. 7 | ⊙ | ○ | 1 | 1 | — | — | X |
| Ex. 5 | ⊙ | ⊙ | 5 | 5 | ⊙ | ⊙ | ⊙ |

TABLE 2-continued

|  | Scratch | Adhesive Property | | Blocking | Weather | Overall |
| --- | --- | --- | --- | --- | --- | --- |
|  | Haze | Resistance | α | β | Resistance | Resistance – 1 | Evaluation |
| Ex. 6 | ◎ | ◎ | 5 | 5 | ◎ | ◎ | ◎ |
| C. Ex. 8 | ◎ | ◎ | 5 | 5 | ◎ | X | X |

Ex.: Example,
C. Ex.: Comparative Example

As is obvious from the results shown in Table 2, the optical adhesive laminated films of the present invention are excellent in weather resistance, adhesive properties, transparency and scratch resistance and useful as an optical adhesive base film.

Examples 7 to 11 and
Comparative Examples 9 to 18

Polyethylene terephthalates (intrinsic viscosity: 0.62) containing 1 wt % of ultraviolet absorber represented by the above formula (A) were melt-extruded onto a rotary cooling drum kept at 20° C. so as to form unstretched films.

Then, after the films were stretched to 3.4 times in a longitudinal direction, both surfaces of the films were uniformly coated with 8% aqueous coating solutions of the following compositions for coating films (Table 3) by use of a roller coater.

TABLE 3

|  | Polyester | | Filler | | Additive D | Additive E | Wetting Agent |
| --- | --- | --- | --- | --- | --- | --- | --- |
|  | Type | Wt % | Type | Wt % | Wt % | Wt % | Wt % |
| Ex. 7 | A-5 | 75 | C-1 | 10 | 3 | 2 | 10 |
| Ex. 8 | A-5 | 65 | C-1 | 15 | 8 | 2 | 10 |
| C. Ex. 9 | A-5 | 55 | C-1 | 20 | 5 | 5 | 15 |
| Ex. 9 | A-6 | 80 | C-2 | 5 | 3 | 2 | 10 |
| C. Ex. 10 | A-6 | 92 | C-2 | 3 | — | — | 5 |
| Ex. 10 | A-7 | 70 | C-3 | 15 | 3 | 2 | 10 |
| Ex. 11 | A-6 | 75 | C-1 | 10 | 3 | 2 | 10 |
| C. Ex. 11 | A-8 | 75 | C-1 | 10 | 3 | 2 | 10 |
| C. Ex. 12 | A-9 | 75 | C-1 | 10 | 3 | 2 | 10 |
| C. Ex. 13 | A-6 | 65 | C-4 | 20 | 3 | 2 | 10 |
| C. Ex. 14 | A-5 | 85 | C-5 | 2 | 3 | — | 10 |
| C. Ex. 15 | A-5 | 65 | C-3 | 25 | 3 | 2 | 5 |
| C. Ex. 16 | A-5 | 82 | C-2 | 0.5 | 5.5 | 2 | 10 |
| C. Ex. 17 | A-10 | 75 | C-1 | 10 | 3 | 2 | 10 |
| C. Ex. 18 | A-11 | 75 | C-1 | 10 | 3 | 2 | 10 |

Ex.: Example,
C. Ex.: Comparative Example

Polyester A-5: Polyester (Tg=88° C., intrinsic viscosity: 0.45, refractive index: 1.58) comprising, as acid components, 80 mol % of 2,6-naphthalenedicarboxylic acid, 15 mol % of isophthalic acid and 5 mol % of 5-sodium sulfoisophthalic acid and, as glycol components, 80 mol % of ethylene glycol and 20 mol % of diethylene glycol.

Polyester A-6: Polyester (Tg=58° C., intrinsic viscosity: 0.55, refractive index: 1.56) comprising, as acid components, 90 mol % of terephthalic acid, 6 mol % of isophthalic acid and 4 mol % of 5-sodium sulfoisophthalic acid and, as glycol components, 70 mol % of ethylene glycol and 30 mol % of diethylene glycol.

Polyester A-7: Polyester (Tg=44° C., intrinsic viscosity: 0.62, refractive index: 1.55) comprising, as acid components, 70 mol % of terephthalic acid, 25 mol % of isophthalic acid and 5 mol % of 5-sodium sulfoisophthalic acid and, as glycol components, 60 mol % of ethylene glycol and 40 mol % of diethylene glycol.

Polyester A-8: Polyester (Tg=103° C., intrinsic viscosity: 0.48, refractive index: 1.59) comprising, as acid components, 90 mol % of 2,6-naphthalenedicarboxylic acid, 2 mol % of isophthalic acid and 8 mol % of 5-sodium sulfoisophthalic acid and, as glycol components, 90 mol % of ethylene glycol and 10 mol % of diethylene glycol.

Polyester A-9: Polyester (Tg=38° C., intrinsic viscosity: 0.43, refractive index: 1.55) comprising, as acid components, 70 mol % of terephthalic acid, 20 mol % of isophthalic acid and 10 mol % of 5-sodium sulfoisophthalic acid and, as glycol components, 70 mol % of 1,4-butanediol and 30 mol % of neopentyl glycol.

Polyester A-10: Polyester (Tg=75° C., intrinsic viscosity: 0.38, refractive index: 1.57) comprising, as acid components, 70 mol % of 2,6-naphthalenedicarboxylic acid, 25 mol % of isophthalic acid and 5 mol % of 5-sodium sulfoisophthalic acid and, as glycol components, 70 mol % of ethylene glycol and 30 mol % of diethylene glycol.

Polyester A-11: Polyester (Tg=45° C., intrinsic viscosity: 0.72, refractive index: 1.55) comprising, as acid components, 75 mol % of terephthalic acid, 23 mol % of isophthalic acid and 2 mol % of 5-sodium sulfoisophthalic acid and, as glycol components, 60 mol % of ethylene glycol and 40 mol % of diethylene glycol.

Filler C-1: Crosslinked acryl filler (average particle diameter: 0.03 μm, refractive index: 1.50)

Filler C-2: Composite inorganic particles of silica and titania (average particle diameter: 0.10 μm, refractive index: 1.56)

Filler C-3: Silica filler (average particle diameter: 0.04 μm, refractive index: 1.42)

Filler C-4: Crosslinked acryl filler (average particle diameter: 0.015 μm, refractive index: 1.50)

Filler C-5: Crosslinked acryl filler (average particle diameter: 0.25 μm, refractive index: 1.50)

Additive D: N,N'-ethylenebiscaprylamide

Additive E: Sodium p-dodecylbenzenesulfonate

Wetting agent: Polyoxyethylene (n=7) lauryl ether

Then, the coated films were dried at 95° C., stretched to 3.7 times in a transverse direction at 120° C., caused to shrink for 3% in a width direction at 220° C. and then heat-set so as to obtain adhesive films having a thickness of 125 μm. The coating films had a thickness of 0.08 μm.

The results of evaluations of these adhesive films are shown in Table 4.

Comparative Example 19

The procedure of Example 7 was repeated except that the aqueous solution was not applied. The properties of the obtained biaxially oriented polyester film are shown in Table 4.

Examples 12 and 13 and Comparative Example 20

Biaxially stretched polyester films were obtained in the same manner as in Example 7 except that a polyester containing 1 wt % of ultraviolet absorber represented by the above formula (B) was used in Example 12, a polyester containing 1 wt % of ultraviolet absorber represented by the above formula (C) was used in Example 13, and a polyester containing no ultraviolet absorber was used in Comparative Example 20. The properties of the obtained biaxially oriented polyester films are shown in Table 4.

TABLE 4

| | Haze | Hard Coat Adhesive Property (α) | Blocking Resistance | Heat Resistance | Weather Resistance – 1 | Surface Resistivity Ω/□ | Overall Evaluation |
|---|---|---|---|---|---|---|---|
| Ex. 7 | ◎ | 5 | ◎ | ◎ | ◎ | 6.6 × 10¹² | ◎ |
| Ex. 8 | ◎ | 4 | ◎ | ◎ | ◎ | 1.2 × 10¹³ | ◎ |
| C. Ex. 9 | ○ | 2 | ◎ | ○ | ○ | 3.1 × 10¹¹ | X |
| Ex. 9 | ◎ | 5 | ◎ | ◎ | ◎ | 7.3 × 10¹² | ◎ |
| C. Ex. 10 | ◎ | 5 | X | ◎ | ◎ | 2.3 × 10¹⁶ | X |
| Ex. 10 | ○ | 5 | ○ | ○ | ○ | 7.7 × 10¹² | ○ |
| Ex. 11 | ◎ | 5 | ○ | ◎ | ◎ | 6.7 × 10¹² | ○ |
| C. Ex. 11 | X | 5 | ◎ | — | — | 9.2 × 10¹² | X |
| C. Ex. 12 | ◎ | 5 | X | ○ | ◎ | 1.1 × 10¹³ | X |
| C. Ex. 13 | ○ | 4 | X | ○ | ○ | 2.2 × 10¹³ | X |
| C. Ex. 14 | X | 5 | ○ | — | — | 2.2 × 10¹⁶ | X |
| C. Ex. 15 | X | 4 | ◎ | — | — | 3.3 × 10¹³ | X |
| C. Ex. 16 | ◎ | 5 | X | ◎ | ◎ | 8.5 × 10¹² | X |
| C. Ex. 17 | ◎ | 5 | ◎ | X | ○ | 8.3 × 10¹² | X |
| C. Ex. 18 | X | 5 | ◎ | — | — | 9.2 × 10¹² | X |
| C. Ex. 19 | ◎ | 1 | — | — | — | 7.4 × 10¹⁵ | X |
| Ex. 12 | ◎ | 5 | ◎ | ◎ | ◎ | 6.2 × 10¹² | ◎ |
| Ex. 13 | ◎ | 5 | ◎ | ◎ | ◎ | 8.7 × 10¹² | ◎ |
| C. Ex. 20 | ◎ | 5 | ◎ | ◎ | X | 1.5 × 10¹³ | X |

Ex.: Example,
C. Ex.: Comparative Example
* In Table 4, "—" indicates that no evaluation was made.

As is obvious from the results shown in Table 4, the biaxially oriented polyester films of the present invention are excellent in weather resistance, adhesive properties, transparency and scratch resistance and useful as an optical adhesive polyester film.

Examples 14 to 22 and Comparative Examples 21 and 22

Polyethylene terephthalates (intrinsic viscosity: 0.62) containing 1 wt % of ultraviolet absorber represented by the above formula (A) were melt-extruded onto a rotary cooling drum kept at 20° C. so as to form unstretched films.

Then, after the films were stretched to 3.4 times in a longitudinal direction, both surfaces of the films were uniformly coated with 4% aqueous coating solutions of compositions for coating films which were shown in Table 5 by use of a roller coater.

Then, the coated films were dried at 95° C., stretched to 3.7 times in a transverse direction at 120° C., caused to shrink for 3% in a width direction at 220° C. and then heat-set so as to obtain optical adhesive polyester films having a thickness of 125 μm. The coating films had a thickness of 0.04 μm.

TABLE 5

| | Acrylic Resin | | Crosslinking Agent | | Filler | Wetting Agent |
|---|---|---|---|---|---|---|
| | Type | Wt % | Type | Wt % | Wt % | Wt % |
| C. Ex. 21 | A-12 | 90 | — | — | — | 10 |
| Ex. 14 | A-13 | 90 | — | — | — | 10 |
| Ex. 15 | A-14 | 80 | B-5 | 5 | 5 | 10 |
| Ex. 16 | A-15 | 75 | B-5 | 10 | 5 | 10 |
| Ex. 17 | A-16 | 80 | B-5 | 10 | — | 10 |
| Ex. 18 | A-17 | 80 | B-5 | 10 | — | 10 |
| Ex. 19 | A-18 | 65 | B-6 | 25 | — | 10 |
| Ex. 20 | A-16 | 80 | B-3 | 10 | — | 10 |
| Ex. 21 | A-16 | 80 | B-4 | 10 | — | 10 |
| Ex. 22 | A-19 | 87 | B-5 | 3 | — | 10 |
| C. Ex. 22 | A-20 | 90 | — | — | — | 10 |

Ex.: Example,
C. Ex.: Comparative Example
* In Table 5, "—" indicates that no evaluation was made.

The components in Table 5 are as follows.

<Acrylic Resins>

A-12: Acrylic resin (Tg=18° C.) comprising 50 mol % of methyl methacrylate and 50 mol % of ethyl acrylate A-13: Acrylic resin (Tg=25° C.) comprising 55 mol % of methyl methacrylate, 43 mol % of ethyl acrylate, and 2 mol % of N-methylolacrylamide A-14: Acrylic resin (Tg=27° C.) comprising 55 mol % of methyl methacrylate, 40 mol % of ethyl acrylate, 3 mol % of N-methylolacrylamide, and 2 mol % of 2-hydroxyethyl methacrylate A-15: Acrylic resin (Tg=40° C.) comprising 65 mol % of methyl methacrylate, 30 mol % of ethyl acrylate, 3 mol % of N-methylolacrylamide, and 2 mol % of 2-hydroxyethyl methacrylate A-16: Acrylic resin (Tg=47° C.) comprising 70 mol % of methyl methacrylate, 25 mol % of ethyl acrylate, 3 mol % of N-methylolacrylamide, and 2 mol % of 2-hydroxyethyl methacrylate A-17: Acrylic resin (Tg=60° C.) comprising 80 mol % of methyl methacrylate, 15 mol % of ethyl acrylate, 3 mol % of N-methylolacrylamide, and 2 mol % of 2-hydroxyethyl methacrylate A-18: Acrylic resin (Tg=42° C.) comprising 63 mol % of methyl methacrylate, 25 mol % of ethyl acrylate, 5 mol % of N-methylolacrylamide, and 7 mol % of 2-hydroxyethyl methacrylate A-19: Acrylic resin (Tg=74° C.) comprising 92 mol % of methyl methacrylate, 5 mol % of ethyl acrylate, and 3 mol % of N-methylolacrylamide A-20: Acrylic resin (Tg=81° C.) comprising 96 mol % of methyl methacrylate and 4 mol % of ethyl acrylate <Crosslinking Agent>

B-5: Epoxy resin, i.e.,

N,N,N',N'-tetraglycidylmetaxylylenediamine

B-6: Polymer having an oxazoline group, i.e., copolymer comprising 2-propenyl-oxazoline (60 mol %) and methyl methacrylate (40 mol %).

<Filler>

Crosslinked acryl filler (average particle diameter: 0.03 μm)

<Wetting Agent>

Polyoxyethylene (n=7) lauryl ether

The results of evaluations of these optical adhesive polyester films are shown in Table 6.

Comparative Example 23

The procedure of Example 17 was repeated except that the aqueous solution was not applied. The properties of the obtained optical adhesive polyester film are shown in Table 6.

Examples 23 and 24 and Comparative Example 24

Optical adhesive polyester films were obtained in the same manner as in Example 17 except that a polyester containing 1 wt % of ultraviolet absorber represented by the above formula (B) was used in Example 23, a polyester containing 1 wt % of ultraviolet absorber represented by the above formula (C) was used in Example 24, and a polyester containing no ultraviolet absorber was used in Comparative Example 24. The properties of the obtained biaxially oriented polyester films are shown in Table 6.

TABLE 6

| | Haze | Hard Coat Adhesive Property (α) | Blocking Resistance | Weather Resistance - 2 | Overall Evaluation |
|---|---|---|---|---|---|
| C. Ex. 21 | ⊚ | 3 | X | — | X |
| Ex. 14 | ⊚ | 4 | ○ | ⊚ | ○ |
| Ex. 15 | ⊚ | 5 | ⊚ | ⊚ | ⊚ |
| Ex. 16 | ⊚ | 5 | ⊚ | ⊚ | ⊚ |
| Ex. 17 | ⊚ | 5 | ⊚ | ⊚ | ⊚ |
| Ex. 18 | ⊚ | 5 | ⊚ | ⊚ | ⊚ |
| Ex. 19 | ⊚ | 5 | ⊚ | ⊚ | ⊚ |
| Ex. 20 | ⊚ | 4 | ⊚ | ⊚ | ○ |
| Ex. 21 | ⊚ | 4 | ⊚ | ⊚ | ○ |
| Ex. 22 | ○ | 5 | ⊚ | ○ | ○ |
| C. Ex. 22 | X | — | — | — | X |
| C. Ex. 23 | ⊚ | 1 | — | — | X |
| Ex. 23 | ⊚ | 5 | ⊚ | ⊚ | ⊚ |
| Ex. 24 | ⊚ | 5 | ⊚ | ⊚ | ⊚ |
| C. Ex. 24 | ⊚ | 5 | ⊚ | X | X |

Ex.: Example,
C. Ex.: Comparative Example
* In Table 6, "—" indicates that no evaluation was made.

As is obvious from the results shown in Table 6, the biaxially oriented polyester films of the present invention are excellent in weather resistance, adhesive properties and transparency and useful as an optical adhesive polyester film.

Example 25

Polyethylene terephthalate chips A (intrinsic viscosity: 0.63) containing 1.1 wt % of ultraviolet absorber represented by the above formula (A) were prepared. Further, polyethylene terephthalate chips B (intrinsic viscosity: 0.62) containing 0.01 wt % of porous silica (diameter of primary particle: 0.004 μm, pore volume: 1.2 ml/g) having an average particle diameter of 1.5 μm were also prepared. The chips A and B were dried at 160° C. for 3 hours.

In addition, a coating solution comprising 85 parts by weight of polyester, 5 parts by weight of filler and 10 parts by weight of wetting agent was also prepared. The polyester used for the coating solution was a polyester (Tg=80° C.) comprising, as acid components, 65 mol % of 2,6-naphthalenedicarboxylic acid, 30 mol % of isophthalic acid and 5 mol % of 5-sodium sulfoisophthalic acid and, as glycol components, 90 mol % of ethylene glycol and 10 mol % of diethylene glycol. The filler was a crosslinked acryl filler (60 nm). The wetting agent was a polyoxyethylene (n=7) lauryl ether.

Then, the above two types of chips were fed to separate extruders, melt-extruded at 290° C., laminated into three layers comprising an inner layer of which was obtained from the polyethylene terephthalate chips A and surface layers of which were obtained from the polyethylene terephthalate chips B by use of a multimanifold die, and quenched on a cooling drum kept at 20° C. to be solidified so as to obtain an unstretched film. Then, the unstretched film was stretched to 3.2 times in a longitudinal direction at 95° C.; the above coating solution was applied to both surfaces of the film such that the thickness of the coating film would be 0.04 μm when dried; and the coated film was then stretched to 3.6 times in a transverse direction at 110° C., heat-set at 230° C. for 5 seconds and then caused to relax for 0.5% in a width direction at 190° C. so as to obtain a laminated polyester film having a thickness of 100 μm. The thickness of the surface layer B was 5 μm, and the thickness of the inner layer A was 90 μm. The properties of the obtained film are shown in Table 7.

Examples 26 and 27 and Comparative Example 25

Laminated polyester films were obtained in the same manner as in Example 25 except that 1.1 wt % of ultraviolet absorber represented by the above formula (B) was contained in the polyethylene terephthalate chips A in Example 26, 0.8 wt % of ultraviolet absorber represented by the above formula (C) was contained in the polyethylene terephthalate chips A in Example 27, and no ultraviolet absorber was contained in the polyethylene terephthalate chips A in Comparative Example 25. The properties of the obtained films are shown in Table 7.

Example 28

A laminated polyester film was obtained in the same manner as in Example 25 except that the thickness of the film was 188 μm, the thickness of the external layer was 10 μm, and the thickness of the inner layer was 168 μm. The properties of the obtained film are shown in Table 7.

Example 29

A laminated polyester film was obtained in the same manner as in Example 25 except that the relaxation rate in the width direction was 0%. The properties of the obtained film are shown in Table 7.

Example 30

A laminated polyester film was obtained in the same manner as in Example 25 except that the thickness of the external layer was 12 μm, and the thickness of the inner layer was 76 μm. The properties of the obtained film are shown in Table 7.

Example 31

A laminated polyester film was obtained in the same manner as in Example 25 except that the content of the porous silica contained in the polyethylene terephthalate chips B was 0.04 wt %. The properties of the obtained film are shown in Table 7.

Example 32

A laminated polyester film was obtained in the same manner as in Example 25 except that the same type of porous silica as contained in the polyethylene terephthalate chips B was also contained in the polyethylene terephthalate chips A in an amount of 0.003 wt %. The properties of the obtained film are shown in Table 7.

Comparative Example 26

A laminated polyester film was obtained in the same manner as in Example 25 except that the film was further stretched for 1.5% in the width direction at 200° C. after heat-set. The properties of the obtained film are shown in Table 7.

Comparative Example 27

A laminated polyester film was obtained in the same manner as in Example 25 except that 0.1 wt % of spherical silica having an average particle diameter of 0.12 μm was added to the polyethylene terephthalate chips A in addition to the ultraviolet absorber. The properties of the obtained film are shown in Table 7.

Comparative Example 28

A laminated polyester film was obtained in the same manner as in Example 25 except that the content of the porous silica contained in the polyethylene terephthalate chips B was changed to 0.08 wt %, the thickness of the external layer was changed to 20 μm, and the thickness of the inner layer was changed to 60 μm. The properties of the obtained film are shown in Table 7.

Comparative Example 29

A laminated polyester film was obtained in the same manner as in Example 25 except that the stretch ratio in the longitudinal direction was 3.7 times, the stretch ratio in the transverse direction was 3.9 times, and the heat-setting temperature was 205° C. The properties of the obtained film are shown in Table 7.

Comparative Example 30

Polyethylene terephthalate chips (intrinsic viscosity: 0.63) containing 1.0 wt % of the same ultraviolet absorber as used in Example 1 and 0.003 wt % of porous silica (diameter of primary particle: 0.004 μm, pore volume: 1.2 ml/g) having an average particle diameter of 1.5 μm were prepared. After dried at 160° C. for 3 hours, they were fed to an extruder so as to be melt-extruded at 290° C. The rest was done in the same manner as in Example 25 so as to obtain a single-layer polyester film. The properties of the obtained film are shown in Table 7.

TABLE 7

|  |  | Film Thickness (μm) | | | Ultraviolet Absorber in Inner Layer | | Transmittance at 370 nm (%) | Heat Shrinkage Rate (%) | |
| --- | --- | --- | --- | --- | --- | --- | --- | --- | --- |
|  |  | Total Thickness | Inner Layer | External Layer | Type | Content (wt %) |  | Longitudinal Direction | Transverse Direction |
| Ex. | 25 | 100 | 90 | 5 | (A) | 1.1 | ○ | 0.8 | 0.6 |
|  | 26 |  |  |  | (B) |  | ○ | 0.8 | 0.6 |
|  | 27 |  |  |  | (C) | 0.8 | ○ | 0.8 | 0.6 |
|  | 28 | 188 | 168 | 10 | (A) | 1.1 | ○ | 0.8 | 0.6 |
|  | 29 | 100 | 90 | 5 |  |  | ○ | 0.8 | 1.0 |
|  | 30 |  | 76 | 12 |  |  | ○ | 0.8 | 0.6 |
|  | 31 |  | 90 | 5 |  |  | ○ | 0.8 | 0.6 |
|  | 32 |  |  |  |  |  | ○ | 0.8 | 0.6 |
| C. Ex. | 25 | 100 | 90 | 5 | None |  | X | 0.8 | 0.6 |
|  | 26 |  |  |  | (A) | 1.1 | ○ | 0.7 | 2.2 |
|  | 27 |  | 90 | 5 |  |  | ○ | 0.8 | 0.6 |
|  | 28 |  | 60 | 20 |  |  | ○ | 0.8 | 0.6 |
|  | 29 |  | 90 | 5 |  |  | ○ | 1.4 | 1.8 |
|  | 30 |  | Single-Layer |  |  |  | ○ | 0.8 | 0.6 |

TABLE 7-continued

| | | Haze | Ra (nm) | Refractive Index Thickness Direction | Coefficient of Friction | Adhesive Property α | Adhesive Property β | Scratch Resistance | Weather Resistance – 1 |
|---|---|---|---|---|---|---|---|---|---|
| Ex. | 25 | ◎ | 6.3 | 1.400 | ○ | ○ | ○ | ○ | ○ |
| | 26 | ◎ | 6.5 | 1.400 | ○ | ○ | ○ | ○ | ○ |
| | 27 | ◎ | 6.7 | 1.400 | ○ | ○ | ○ | ○ | ○ |
| | 28 | ○ | 8.2 | 1.401 | ○ | ○ | ○ | ○ | ○ |
| | 29 | ◎ | 6.6 | 1.400 | ○ | ○ | ○ | ○ | ○ |
| | 30 | ○ | 8.3 | 1.400 | ○ | ○ | ○ | ○ | ○ |
| | 31 | ○ | 15.8 | 1.400 | ○ | ○ | ○ | ○ | ○ |
| | 32 | ○ | 6.9 | 1.400 | ○ | ○ | ○ | ○ | ○ |
| C. Ex. | 25 | ◎ | 6.3 | 1.400 | ○ | ○ | ○ | ○ | X |
| | 26 | ◎ | 6.6 | 1.399 | ○ | ○ | X | ○ | ○ |
| | 27 | X | 7.2 | 1.398 | ○ | ○ | ○ | ○ | ○ |
| | 28 | X | 32.1 | 1.398 | ○ | ○ | ○ | ○ | ○ |
| | 29 | ◎ | 6.8 | 1.389 | ○ | X | X | ○ | ○ |
| | 30 | ◎ | 4.0 | 1.400 | X | ○ | ○ | X | ○ |

Ex.: Example,
C. Ex.: Comparative Example

Example 33

After polyethylene terephthalate (intrinsic viscosity: 0.63) chips containing 30 ppm of porous silica (diameter of primary particle: 0.004 μm, pore volume: 1.2 ml/g) having an average particle diameter of 1.5 μm and 1 wt % of ultraviolet absorber represented by the above formula (A) were dried at 160° C. for 3 hours, they were melt-extruded at 290° C. and then quenched on a cooling drum kept at 20° C. to be solidified so as to obtain an unstretched film.

Then, the unstretched film was stretched to 3.2 times in a longitudinal direction at 95° C.; the following coating solution was applied to both surfaces of the film such that the thickness of the coating film would be 0.04 μm when dried; and the coated film was stretched to 3.6 times in a transverse direction at 110° C., heat-set at 230° C. for 5 seconds and then caused to relax for 0.5% in a width direction at 190° C. so as to obtain a biaxially oriented laminated polyester film having a thickness of 100 μm. The properties of the obtained film are shown in Table 8.

The coating solution used above comprised 85 parts by weight of polyester, 5 parts by weight of crosslinked acryl filler (60 nm) as a filler, and 10 parts by weight of polyoxyethylene (n=7) lauryl ether as a wetting agent. The polyester used for the coating solution was a polyester (Tg=80° C.) comprising, as acid components, 65 mol % of 2,6-naphthalenedicarboxylic acid, 30 mol % of isophthalic acid and 5 mol % of 5-sodium sulfoisophthalic acid and, as glycol components, 90 mol % of ethylene glycol and 10 mol % of diethylene glycol.

Examples 34 and 35 and Comparative Example 31

Polyester films were obtained in the same manner as in Example 33 except that a polyethylene terephthalate containing 1 wt % of ultraviolet absorber represented by the above formula (B) was used in Example 34, a polyethylene terephthalate containing 0.7 wt % of ultraviolet absorber represented by the above formula (C) was used in Example 35, and a polyethylene terephthalate containing no ultraviolet absorber was used in Comparative Example 31.

Example 36

A polyester film was obtained in the same manner as in Example 33 except that the thickness of the film was 188 μm.

Example 37

A polyester film was obtained in the same manner as in Example 33 except that the relaxation rate in the width direction was 0%, and the thickness of the heat-set film was 188 μm.

Comparative Example 32

A polyester film was obtained in the same manner as in Example 33 except that after heat-set, the film was further stretched for 1.5% in the width direction at 200° C.

Comparative Example 33

A polyester film was obtained in the same manner as in Example 33 except that the inert particles contained in the polyester were changed to spherical silica having an average particle diameter of 0.12 μm, and its content was 0.1 wt %.

Comparative Example 34

A polyester film was obtained in the same manner as in Example 33 except that the inert particles contained in the polyester were changed to spherical silica having an average particle diameter of 0.30 μm, and its content was 0.2 wt %.

Comparative Example 35

A polyester film was obtained in the same manner as in Example 33 except that a polyester containing no inert particles was used, the filler contained in the coating solution was changed to spherical silica particles having a particle diameter of 8 nm, and the thickness of the coating layer after dried was changed to 0.004 μm.

Comparative Example 36

A polyester film was obtained in the same manner as in Example 33 except that the stretch ratio in the longitudinal direction was changed to 3.7 times, the stretch ratio in the transverse direction was changed to 3.9 times, and the heat-setting temperature was changed to 205° C.

TABLE 8

| | | Film Thickness (μm) | Ultraviolet Absorber Type | Ultraviolet Absorber Content (wt %) | Transmittance at 370 nm (%) | Heat Shrinkage Rate (%) MD | Heat Shrinkage Rate (%) TD |
|---|---|---|---|---|---|---|---|
| Ex. | 33 | 100 | A | 1 | ○ | 0.8 | 0.6 |
| | 34 | | B | | ○ | 0.8 | 0.6 |
| | 35 | | C | 0.7 | ○ | 0.8 | 0.6 |
| | 36 | 188 | A | 1 | ○ | 0.8 | 0.6 |
| | 37 | 100 | | | ○ | 0.8 | 1.0 |
| C. Ex. | 31 | 100 | None | | X | 0.8 | 0.6 |
| | 32 | | A | 1 | ○ | 0.7 | 2.2 |
| | 33 | | | | ○ | 0.8 | 0.6 |
| | 34 | | | | ○ | 0.8 | 0.6 |
| | 35 | | | | ○ | 0.8 | 0.6 |
| | 36 | | | | ○ | 1.4 | 1.8 |

| | | Haze | Ra (nm) | Refractive Index in Thickness Direction | Coefficient of Friction | Adhesive Property α | Adhesive Property β | Scratch Resistance | Weather Resistance – 1 |
|---|---|---|---|---|---|---|---|---|---|
| Ex. | 33 | ◎ | 3.8 | 1.400 | ○ | ○ | ○ | ○ | ○ |
| | 34 | ◎ | 4.0 | 1.400 | ○ | ○ | ○ | ○ | ○ |
| | 35 | ◎ | 3.8 | 1.400 | ○ | ○ | ○ | ○ | ○ |
| | 36 | ○ | 4.1 | 1.401 | ○ | ○ | ○ | ○ | ○ |
| | 37 | ◎ | 3.4 | 1.400 | ○ | ○ | ○ | ○ | ○ |
| C. Ex. | 31 | ◎ | 3.8 | 1.400 | ○ | ○ | ○ | ○ | X |
| | 32 | ◎ | 3.7 | 1.399 | ○ | ○ | X | ○ | ○ |
| | 33 | X | 7.2 | 1.398 | ○ | ○ | ○ | ○ | ○ |
| | 34 | X | 14.2 | 1.398 | ○ | ○ | ○ | ○ | ○ |
| | 35 | ◎ | 0.7 | 1.401 | X | ○ | ○ | X | ○ |
| | 36 | ◎ | 3.8 | 1.389 | ○ | X | X | ○ | ○ |

Ex.: Example,
C. Ex.: Comparative Example

Example 38

Polyethylene terephthalate chips A (intrinsic viscosity: 0.63) containing 1.0 wt % of ultraviolet absorber represented by the above formula (A) were prepared. Further, polyethylene terephthalate chips B (intrinsic viscosity: 0.62) containing 1.0 wt % of ultraviolet absorber represented by the above formula (A) and 0.01 wt % of porous silica (diameter of primary particle: 0.004 μm, pore volume: 1.2 ml/g) having an average particle diameter of 1.5 μm were also prepared. The chips A and B were dried at 160° C. for 3 hours.

In addition, a coating solution comprising 85 parts by weight of polyester, 5 parts by weight of filler and 10 parts by weight of wetting agent was also prepared. The polyester used for the coating solution was a polyester (Tg=80° C.) comprising, as acid components, 65 mol % of 2,6-naphthalenedicarboxylic acid, 30 mol % of isophthalic acid and 5 mol % of 5-sodium sulfoisophthalic acid and, as glycol components, 90 mol % of ethylene glycol and 10 mol % of diethylene glycol. The filler was a crosslinked acryl filler (60 nm). The wetting agent was a polyoxyethylene (n=7) lauryl ether.

Then, the above two types of chips were fed to separate extruders, melt-extruded at 290° C., laminated into three layers comprising an inner layer of which was obtained from the polyethylene terephthalate chips A and surface layers of which were obtained from the polyethylene terephthalate chips B by use of a multimanifold die, and quenched on a cooling drum kept at 20° C. to be solidified so as to obtain an unstretched film. Then, the unstretched film was stretched to 3.2 times in a longitudinal direction at 95° C.; the above coating solution was applied to both surfaces of the film such that the thickness of the coating film would be 0.04 μm when dried; and the coated film was then stretched to 3.6 times in a transverse direction at 110° C., heat-set at 230° C. for 5 seconds and then caused to relax for 0.5% in a width direction at 190° C. so as to obtain a laminated polyester film having a thickness of 100 μm. The thickness of the surface layer B was 5 μm, and the thickness of the inner layer was 90 μm. The properties of the obtained film are shown in Table 9.

Examples 39 and 40 and Comparative Example 37

Laminated polyester films were obtained in the same manner as in Example 38 except that 1.0 wt % of ultraviolet absorber represented by the above formula (B) was contained in the polyethylene terephthalate chips A and B in Example 39, 1.2 wt % of ultraviolet absorber represented by the above formula (C) was contained in the polyethylene terephthalate chips A and 0.4 wt % of ultraviolet absorber represented by the above formula (C) was contained in the polyethylene terephthalate chips B in Example 40, and no ultraviolet absorber was contained in the polyethylene terephthalate chips A and B in Comparative Example 37. The properties of the obtained films are shown in Table 9.

Example 41

A laminated polyester film was obtained in the same manner as in Example 38 except that the thickness of the film was 188 μm, the thickness of the external layer was 10 μm, and the thickness of the inner layer was 168 μm. The properties of the obtained film are shown in Table 9.

Example 42

A laminated polyester film was obtained in the same manner as in Example 38 except that the thickness of the external layer was 12 μm, and the thickness of the inner layer was 76 μm. The properties of the obtained film are shown in Table 9.

Example 43

A laminated polyester film was obtained in the same manner as in Example 38 except that the content of the porous silica contained in the polyethylene terephthalate chips B was 0.04 wt %. The properties of the obtained film are shown in Table 9.

Example 44

A laminated polyester film was obtained in the same manner as in Example 38 except that the same type of porous silica as contained in the polyethylene terephthalate chips B was also contained in the polyethylene terephthalate chips A in an amount of 0.003 wt %. The properties of the obtained film are shown in Table 9.

Comparative Example 38

A laminated polyester film was obtained in the same manner as in Example 38 except that 0.1 wt % of spherical silica having an average particle diameter of 0.12 μm was added to the polyethylene terephthalate chips A in addition to the ultraviolet absorber. The properties of the obtained film are shown in Table 9.

Comparative Example 39

A laminated polyester film was obtained in the same manner as in Example 38 except that the content of the porous silica contained in the polyethylene terephthalate chips B was changed to 0.08 wt %, the thickness of the external layer was changed to 20 μm, and the thickness of the inner layer was changed to 60 μm. The properties of the obtained film are shown in Table 9.

Comparative Example 40

A laminated polyester film was obtained in the same manner as in Example 38 except that the stretch ratio in the longitudinal direction was 3.7 times, the stretch ratio in the transverse direction was 3.9 times, and the heat-setting temperature was 205° C. The properties of the obtained film are shown in Table 9.

Comparative Example 41

Polyethylene terephthalate chips (intrinsic viscosity: 0.63) containing 1.0 wt % of the same ultraviolet absorber as used in Example 38 and 0.003 wt % of porous silica (diameter of primary particle: 0.004 μm, pore volume: 1.2 ml/g) having an average particle diameter of 1.5 μm were prepared. After dried at 160° C. for 3 hours, they were fed to an extruder so as to be melt-extruded at 290° C. The rest was done in the same manner as in Example 38 so as to obtain a single-layer polyester film. The properties of the obtained film are shown in Table 9.

Example 45 and Comparative Examples 42 and 43

Laminated polyester films were obtained in the same manner as in Example 38 except that 0.5 wt % of the ultraviolet absorber was contained in the polyethylene terephthalate chips A and 1.5 wt % of the ultraviolet absorber was contained in the polyethylene terephthalate chips B in Example 45, 1.1 wt % of the ultraviolet absorber was contained in the polyethylene terephthalate chips A and the ultraviolet absorber was not contained in the polyethylene terephthalate chips B in Comparative Example 42, and 0.5 wt % of the ultraviolet absorber was contained in the polyethylene terephthalate chips A and 3.0 wt % of the ultraviolet absorber was contained in the polyethylene terephthalate chips B in Comparative Example 43. The properties of the obtained films are shown in Table 9.

TABLE 9

| | Film Thickness (μm) | | | Ultraviolet Absorber | | | | | Transmittance |
| | | | | Inner Layer (Layer A) | | External Layer (Layer B) | | | at 370 nm |
| | Total Thickness | Inner Layer | External Layer | Type | Content CA (wt %) | Type | Content CB (wt %) | CA/CB | (%) |
|---|---|---|---|---|---|---|---|---|---|
| Ex. 38 | 100 | 90 | 5 | (A) | 1.0 | (A) | 1.0 | 1.0 | ○ |
| Ex. 39 | 100 | 90 | 5 | (B) | 1.0 | (B) | 1.0 | 1.0 | ○ |
| Ex. 40 | 100 | 90 | 5 | (C) | 1.2 | (C) | 0.4 | 0.3 | ○ |
| Ex. 41 | 188 | 168 | 10 | (A) | 1.0 | (A) | 1.0 | 1.0 | ○ |
| Ex. 42 | 100 | 76 | 12 | (A) | 1.0 | (A) | 1.0 | 1.0 | ○ |
| Ex. 43 | 100 | 90 | 5 | (A) | 1.0 | (A) | 1.0 | 1.0 | ○ |
| Ex. 44 | 100 | 90 | 5 | (A) | 1.0 | (A) | 1.0 | 1.0 | ○ |
| Ex. 45 | 100 | 90 | 5 | (A) | 0.5 | (A) | 1.5 | 3.0 | ○ |
| C. Ex. 37 | 100 | 90 | 5 | None | | None | | — | X |
| C. Ex. 38 | 100 | 90 | 5 | (A) | 1.0 | (A) | 1.0 | 1.0 | ○ |
| C. Ex. 39 | 100 | 60 | 20 | (A) | 1.0 | (A) | 1.0 | 1.0 | ○ |
| C. Ex. 40 | 100 | 90 | 5 | (A) | 1.0 | (A) | 1.0 | 1.0 | ○ |
| C. Ex. 41 | 100 | Single-Layer | | (A) | 1.0 | (A) | 1.0 | 1.0 | ○ |
| C. Ex. 42 | 100 | 90 | 5 | (A) | 1.1 | (A) | 0 | 0 | ○ |
| C. Ex. 43 | 100 | 90 | 5 | (A) | 0.5 | (A) | 3.0 | 6.0 | Δ |

TABLE 9-continued

|  | Haze | Ra (nm) | Refractive Index Thickness Direction | Coefficient of Friction | Adhesive Property α | Scratch Resistance | Weather Resistance - 2 |
|---|---|---|---|---|---|---|---|
| Ex. 38 | ⊚ | 6.3 | 1.400 | ○ | ○ | ○ | ○ |
| Ex. 39 | ⊚ | 6.5 | 1.400 | ○ | ○ | ○ | ○ |
| Ex. 40 | ⊚ | 6.7 | 1.400 | ○ | ○ | ○ | ○ |
| Ex. 41 | ○ | 8.2 | 1.401 | ○ | ○ | ○ | ○ |
| Ex. 42 | ○ | 8.3 | 1.400 | ○ | ○ | ○ | ○ |
| Ex. 43 | ○ | 15.8 | 1.400 | ○ | ○ | ○ | ○ |
| Ex. 44 | ○ | 6.9 | 1.400 | ○ | ○ | ○ | ○ |
| Ex. 45 | ○ | 6.3 | 1.400 | ○ | ○ | ○ | ○ |
| C. Ex. 37 | ⊚ | 6.3 | 1.400 | ○ | ○ | ○ | X |
| C. Ex. 38 | X | 7.2 | 1.398 | ○ | ○ | ○ | ○ |
| C. Ex. 39 | X | 32.1 | 1.398 | ○ | ○ | ○ | ○ |
| C. Ex. 40 | ⊚ | 6.8 | 1.389 | ○ | X | ○ | ○ |
| C. Ex. 41 | ○ | 4.0 | 1.400 | X | ○ | X | ○ |
| C. Ex. 42 | ○ | 6.3 | 1.400 | ○ | ○ | ○ | X |
| C. Ex. 43 | ○ | 6.3 | 1.400 | ○ | ○ | ○ | X |

Ex.: Example,
C. Ex.: Comparative Example

What is claimed is:

1. An optical adhesive polyester film which comprises:
   (A) a polyester film layer containing an aromatic polyester and an ultraviolet absorber, and
   (B) a coating formed on at least one surface of the polyester film,
   wherein the coating contains a coating polyester having a glass transition point of 40 to 100° C. and an intrinsic viscosity of 0.4 to lower than 0.7 in an amount of 60 to 90% by weight based on the coating, and which is disposed on the front of a plasma display for blocking external incoming ultraviolet light.

2. The film of claim 1, wherein the coating further contains a filler having a particle diameter of 0.02 to 0.2 μm in an amount of 0.1 to 20% by weight based on the coating.

3. The film of claim 1, wherein the coating contains a filler having a particle diameter of 0.02 to 0.2 μm in an amount of 1 to 20% by weight based on the coating.

4. The film of claim 3, wherein the coating polyester and the filler both have a refractive index of 1.50 to 1.60.

5. The film of claim 3 or 10, wherein the coating has a surface resistivity of not higher than $1\times10^{14}$ Ω/□.

6. The film of claim 1, wherein the coating contains a crosslinking agent in an amount of 1 to 40% by weight based on the coating, and a filler having a particle diameter of 0.02 to 0.2 μm in an amount of 0.1 to 20% by weight based on the coating.

7. The film of claim 6, wherein the crosslinking agent is at least one selected from the group consisting of an oxazoline-group-containing polymer, an urea resin, a melamine resin and an epoxy resin.

8. The film of claim 1, 3 or 6, wherein the ultraviolet absorber is at least one compound selected from the group consisting of a cyclic imino ester represented by the following formula (I):

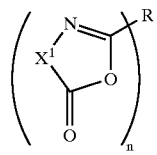

(I)

wherein $X^1$ is a divalent aromatic residue whose two links are at positions 1 and 2; n is 1, 2 or 3; $R^1$ is an n-valent hydrocarbon residue which may further contain a hetero atom, and $R^1$ can be a direct bond when n=2, and a cyclic imino ester represented by the following formula (II):

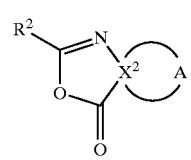

(II)

wherein A is a group represented by the following formula (II)-a or a group represented by the following formula (II)-b; $R^2$ and $R^3$ may be the same or different and are each a monovalent hydrocarbon residue; and $X^2$ is a tetravalent aromatic residue which may further contain a hetero atom

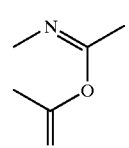

(II)-a

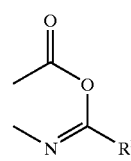

(II)-b

9. The film of claim 1, wherein the polyester film layer (A) is a single layer.

10. The film of claim 1, wherein the polyester film layer (A) comprises at least three layers, i.e., two outermost layers and at least one intermediate layer.

11. The film of claim 10, wherein at least the intermediate layer contains an ultraviolet absorber.

12. The film of claim 1, 9 or 10, having a light transmittance at a wavelength of 370 nm of not higher than 3%, a haze of not higher than 3%, and a refractive index in a thickness direction of 1.490 to 1.505.

13. The film of claim 12, having a heat shrinkage rate at 150° C. of not higher than 2%.

14. The film of claim 1, wherein the polyester film layer (A) is a single layer, and the coating (B) has a center line surface roughness Ra of 1 to 10 nm.

15. The film of claim 1, wherein the polyester film layer (A) comprises at least three layers, and the coating (B) has a center line surface roughness Ra of 3 to 30 nm.

16. The film of claim 1, wherein the polyester film layer (A) comprises a polyethylene terephthalate or polyethylene-2,6-naphthalene dicarboxylate.

* * * * *